US011854538B1

(12) United States Patent
Rozgic et al.

(10) Patent No.: US 11,854,538 B1
(45) Date of Patent: Dec. 26, 2023

(54) SENTIMENT DETECTION IN AUDIO DATA

(71) Applicant: Amazon Technologies, Inc., Seattle, WA (US)

(72) Inventors: Viktor Rozgic, Belmont, MA (US); Chao Wang, Newton, MA (US); Ming Sun, Winchester, MA (US); Srinivas Parthasarathy, Richardson, TX (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 16/277,328

(22) Filed: Feb. 15, 2019

(51) Int. Cl.
G10L 15/18 (2013.01)
G10L 15/06 (2013.01)
G10L 15/07 (2013.01)
G10L 15/16 (2006.01)
G10L 15/02 (2006.01)

(52) U.S. Cl.
CPC .......... G10L 15/1815 (2013.01); G10L 15/02 (2013.01); G10L 15/063 (2013.01); G10L 15/07 (2013.01); G10L 15/16 (2013.01)

(58) Field of Classification Search
CPC ..... G10L 15/063; G10L 15/22; G10L 13/043; G10L 13/02; G10L 13/08; G06F 3/167; H04M 3/5175
See application file for complete search history.

(56) References Cited

U.S. PATENT DOCUMENTS 10,049,663 B2 * 8/2018 Orr .......................... G10L 15/22
10,475,451 B1 * 11/2019 Lynch .................... G10L 15/22
10,497,361 B1 * 12/2019 Rule ........................ G06F 3/167
10,586,369 B1 * 3/2020 Roche ..................... G10L 15/26
10,887,464 B2 * 1/2021 Ghuge .................. G06F 40/279
10,896,428 B1 * 1/2021 Balasubramaniam .. G10L 15/02
11,176,929 B1 * 11/2021 Smith ..................... G06F 40/58
2008/0269958 A1 * 10/2008 Filev ..................... A61B 5/4803
701/1
2013/0173269 A1 * 7/2013 Adler .................... G06F 40/289
704/251
2015/0195406 A1 * 7/2015 Dwyer ................ H04M 3/5191
379/265.07

(Continued)

FOREIGN PATENT DOCUMENTS

CA 2967976 A1 * 6/2016 ............. G10L 13/08

OTHER PUBLICATIONS

Aldeneh, et al., "Pooling Acoustic and Lexical Features for the Prediction of Valence." In Proceedings for the 19th ACM International Conference on Multimodal Interaction ICMI 2017, pp. 68-72, New York, NY, USA, ACM.

(Continued)

Primary Examiner — Anne L Thomas-Homescu
(74) Attorney, Agent, or Firm — PIERCE ATWOOD LLP

(57) ABSTRACT

Described herein is a system for sentiment detection in audio data. The system processes audio frame level features of input audio data using a machine learning algorithm to classify the input audio data into a particular sentiment category. The machine learning algorithm may be a neural network trained using an encoder-decoder method. The training of the machine learning algorithm may include normalization techniques to avoid potential bias in the training data that may occur when the training data is annotated for a perceived sentiment of the speaker.

16 Claims, 16 Drawing Sheets

(56) References Cited

U.S. PATENT DOCUMENTS

| | | | | |
|---|---|---|---|---|
| 2015/0301796 | A1* | 10/2015 | Visser | G10L 15/22 |
| | | | | 715/728 |
| 2016/0063993 | A1* | 3/2016 | Dolan | G06F 16/00 |
| | | | | 704/254 |
| 2017/0053323 | A1* | 2/2017 | Steelberg | G06Q 30/0276 |
| 2018/0133900 | A1* | 5/2018 | Breazeal | B25J 19/026 |
| 2018/0182373 | A1* | 6/2018 | Almudafar-Depeyrot | |
| | | | | G10L 13/00 |
| 2018/0189857 | A1* | 7/2018 | Wu | G06F 40/30 |
| 2018/0226071 | A1* | 8/2018 | Winter | H04M 3/5183 |
| 2018/0277093 | A1* | 9/2018 | Carr | G06F 3/011 |
| 2018/0286383 | A1* | 10/2018 | Barari | G10L 13/033 |
| 2018/0293221 | A1* | 10/2018 | Finkelstein | G06F 40/205 |
| 2018/0315094 | A1* | 11/2018 | Ashoori | G10L 25/48 |
| 2019/0012714 | A1* | 1/2019 | Bright | G06F 11/3438 |
| 2019/0050875 | A1* | 2/2019 | McCord | G10L 15/1815 |
| 2019/0147849 | A1* | 5/2019 | Talwar | G06F 40/56 |
| | | | | 704/258 |
| 2019/0164554 | A1* | 5/2019 | Huang | G06F 16/685 |
| 2019/0325866 | A1* | 10/2019 | Bromand | G06F 3/167 |
| 2019/0325867 | A1* | 10/2019 | Bromand | G10L 15/22 |
| 2019/0325895 | A1* | 10/2019 | Bromand | G10L 13/033 |
| 2019/0340254 | A1* | 11/2019 | Catalano | G06F 16/436 |
| 2019/0385711 | A1* | 12/2019 | Shriberg | G10L 25/66 |
| 2020/0075039 | A1* | 3/2020 | Eleftheriou | G10L 25/63 |
| 2020/0075040 | A1* | 3/2020 | Provost | G06N 3/044 |
| 2020/0082805 | A1* | 3/2020 | Zhang | G10L 15/144 |
| 2020/0111474 | A1* | 4/2020 | Kumar | G10L 15/19 |
| 2020/0125639 | A1* | 4/2020 | Doyle | G06F 40/30 |
| 2020/0126533 | A1* | 4/2020 | Doyle | G10L 15/063 |
| 2020/0152197 | A1* | 5/2020 | Penilla | H04L 67/12 |
| 2020/0168226 | A1* | 5/2020 | Ganti | G06F 3/167 |
| 2020/0175961 | A1* | 6/2020 | Thomson | G10L 15/063 |
| 2020/0193353 | A1* | 6/2020 | Weisman | G10L 15/083 |
| 2020/0218781 | A1* | 7/2020 | Takano | G10L 15/22 |
| 2020/0243062 | A1* | 7/2020 | Scodary | G06N 3/0445 |
| 2020/0252510 | A1* | 8/2020 | Ghuge | G10L 15/26 |
| 2020/0279551 | A1* | 9/2020 | Sung | G10L 17/00 |
| 2020/0302953 | A1* | 9/2020 | Ando | G06N 3/0445 |
| 2020/0342852 | A1* | 10/2020 | Kim | G10L 13/047 |
| 2020/0357383 | A1* | 11/2020 | Deng | G10L 13/027 |
| 2021/0043208 | A1* | 2/2021 | Luan | G10L 15/22 |
| 2021/0110895 | A1* | 4/2021 | Shriberg | G16H 50/20 |
| 2021/0225357 | A1* | 7/2021 | Zhao | G10L 13/027 |
| 2021/0287657 | A1* | 9/2021 | Deng | G06F 40/30 |

OTHER PUBLICATIONS

Andrew, et al., "Deep Canonical Correlation Analysis." In Proceedings of the 30th International Conference on International Conference on Machine Learning—vol. 28, ICML 2013, pp. III-1247-III-1255. JMLR.org.

Arevalo, et al., "Gated Multimodal Units for Information Fusion." arXiv Preprint arXiv: 1702.01922.

Bahdanau, et al., "Neural Machine Translation by Jointly Learning to Align and Translate." CoRR, abs/1409.0473. 2014.

Busso, et al., Iemoca: "Interactive Emotional Dyadic Motion Capture Database." Language Resources and Evaluation, 42(4):335. 2008.

Cowie, et al., "Perceiving Emotion: Towards an Realistic Understanding of the Task." Philosophical Transactions of the Royal Sockiety of London B: Bio-logical Sciences, 364(1535):3515-3525. 2009.

Eyben, et al., "Recent Developments in opensmile, the munich open-source Multimedia Feature Extractor." In Proceedings of the 21st ACM International Conference on Multimedia, MM'13, pp. 835-838, New York, NY USA. ACM. 2013.

He, et al., "Multi-view recurrent neural acoustic word embededdings," CoRR, abs/1611.04496. 2017.

Jin, et al., "Speech Emotion Recognition with Acoustic and Lexical Features." ICASSP, 4749-4753. 2015.

Kingma, et al., "ADAM: A Method for Stochastic Optimization." CoRR, abs/1412.6980. 2015.

Majumder, et al. "Multimodal Sentiment Analysis Using Hierarchical Fusion with Context Modeling," 2018.

Mikolov, et al., "Distibuted Representations of Words and Phrases and Their Compositionality." In Advances in Neural Information Processing Systems, pp. 3111-3119, 2009.

Provost, et al., "Interpreting Ambiguous Emotional Expressions," 2009.

Pascanu, et al., "Understanding the Exploding Gradient Problem." CoRR, abs/1211.5063, 2012.

Pennington, et al., Glove: "Global Vectors for Word Representation." In Proceedings of the 2014 Conference on Empirial Methods in Natural Language Processing (EMNLP), pp. 1532-1543, 2014.

Perez-Rosas, et al. "Utterance-level Multi-modal Sentiment Analysis." In Proceedings of the 51st Annual Meeting of the Association for Computational Linguistics (vol. 1: Long Papers), pp. 973-982, Sofia, Bulgaria. Association for Computational Linguistics, 2013.

Peters, et al., "Deep Contextualized Word representations." In Proceedings of the 2018 Conference of the North American Chapter of the Association for Computational Linguistics: Human Language Technologies, vol. 1 (Long Papers), pp. 2227-2237, New Orleans, Louisiana. Association for Computational Linguistics, 2018.

Poria, et al., "Multimodal Sentiment Analysis: Addressing Key Issues and Setting Up Baselines." CoRR, abs/1803.07427, 2018.

Rozgic, et al., "Ensemble of svm Trees for Multimodal Emotion Recognition." In Signal & Information Processing Association Annual Summit and Conference (APSIPA ASC), 2012 Asia-Pacific, pp. 1-4.

Schuller, et al., "The Interspeech 2013 Computational Parlinguistics Challenge: Social Signals, Conflict, Emotion, Autism." In Proceedings INTERSPEECH 2013, 14th Annual Conference of the International Speech Communication Association, Lyon Franse, 2013.

Wang, et al., "On Deep Multi-view Representation Learning." In Proceedings of the 32nd International Conference on Machine Learnin, ICML 2015, Lille, France, Jul. 6-11, 2015, pp. 1083-1092.

Zadeh, et al., "Tensor Fusion Netwok for Multimodal Sentiment Analysis." CoRR, abs/1707.07250, 2017.

Schuller, et al., "Speech Emotion Recognition: Two Decades in a Nutshell, Benchmarks, and Ongoing Trends," Communications of the ACM, vol. 61, No. 5, pp. 90-99, 2018.

Schuller, et al., "Towards More Reality in the Recognition of Emotional Speech," in International Conference on Acoustics, Speech, and Signal Processing (ICASSP 2007), Honolulu, HI, USA, Apr. 2007, vol. 4 pp. 941-944.

Grimm, et al., "Primitives-based evaluation and Estimation of Emotions in Speech," Speech Communication, vol. 49, No. 10-11, pp. 787-800, Oct.-Nov. 2007.

Parthasarathy, et al., "Jointly Predicting Arousal, Valance and Dominance with Multi-task Learning," in Interspeech 2017, Stockholm, Sweden, Aug. 2017, pp. 1103-1107.

Metallinou, et al., "Annotation and Processing of Continuous Emotional Attributes: Challenges and Opportunities," in 2nd International Workshop on Emotion Representation, Analysis and Synthesis in Continuous Time and Space (EmoSPACE 2013), Shanghai, China, Apr. 2013.

Abdelwahab, et al., "Study of Dense Network Approaches for Speech Emotion Recognition," in IEEE International Confernece on Acoustics, Speech and Signal Processing (ICASSP 2018), Calgary, AB, Canada, Apr. 2018, pp. 5084-5088.

Springenberg, et al., "Unsupervised and Semi-supervised Learning with Categorical Generative Adversarial Networks," arXiv preprint arXiv: 1511.06390, 2015.

Paratharsarathy, et al., "Ladder Networks for Emotion Recognition: Using Unsupervised Auxiliary Tasks to Improve Predictions of Emotional Attributes," ArXiv e-prints, pp. 105, Apr. 2018.

Makhzani, et al., "Adversarial Auto-encoders," arXiv preprint arXiv: 1511.05644, 2015.

Sahu, et al., "Adversarial Auto-encoders for Speech Based Emotion Recognition," arXiv preprint arXiv: 1806.02146, 2018.

(56) References Cited

OTHER PUBLICATIONS

Eskimez, et al., "Unsupervised Learning Approach to Feature Analysis for Automatic Speech Emotion Recognition," in 2018 IEEE International Conference on Acoustics, Speech and Signal Processing (ICASSP). 2018, pp. 5099-5103.

Trigeorgis, et al, "Adieu Features? End-to-end Speech Emotion Recognition Using a Deep Convolutional Recurrent Network," in IEEE International Conference on Acoustics, Speech and Signal Processing (ICASSP 2016), Shanghai, China, Mar. 2016, pp. 5200-5204.

Cummins, et al., "An Image-based Deep Spectrum Feature Representation for the Recognition of Emotional Speech," in Proceedings of the 2017 ACM on Multimedia Conference. ACM, 2017, pp. 478-484.

Yang, et al. "Predicting Arousal and Valence from Waveforms and Spectrograms Using Deep Neural Networks," Proc. Internspeech 2018, ppp. 3092-3096, 2018.

Aldeneh, et al., "Using Regional Saliency for Speech Emotion Recognition," in IEEE International Conference on Acoustics, Speech and Signal Processing (ICASSP 2017), New Orleans, LA, USA, Mar. 2017, pp. 2741-2745.

\* cited by examiner

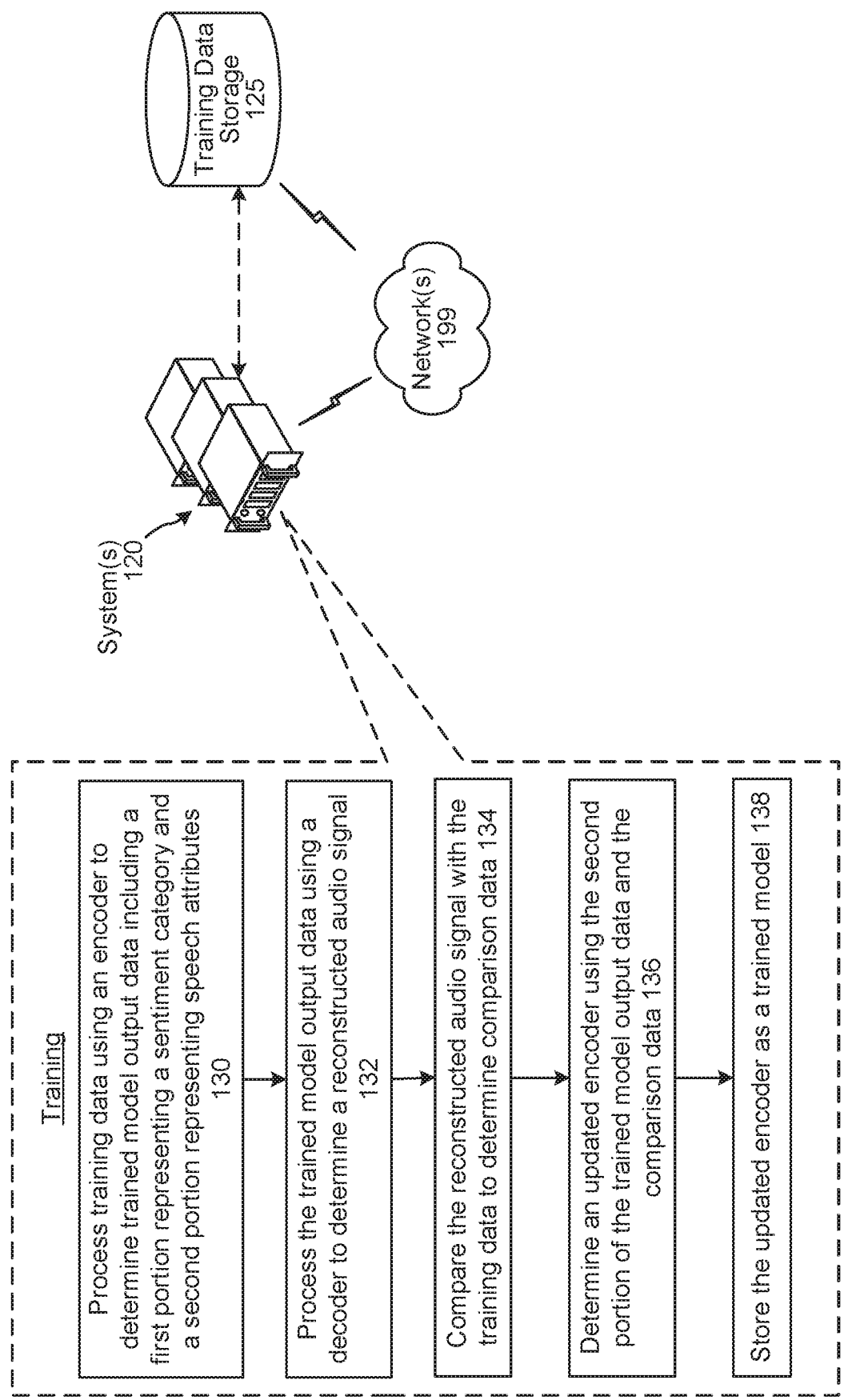

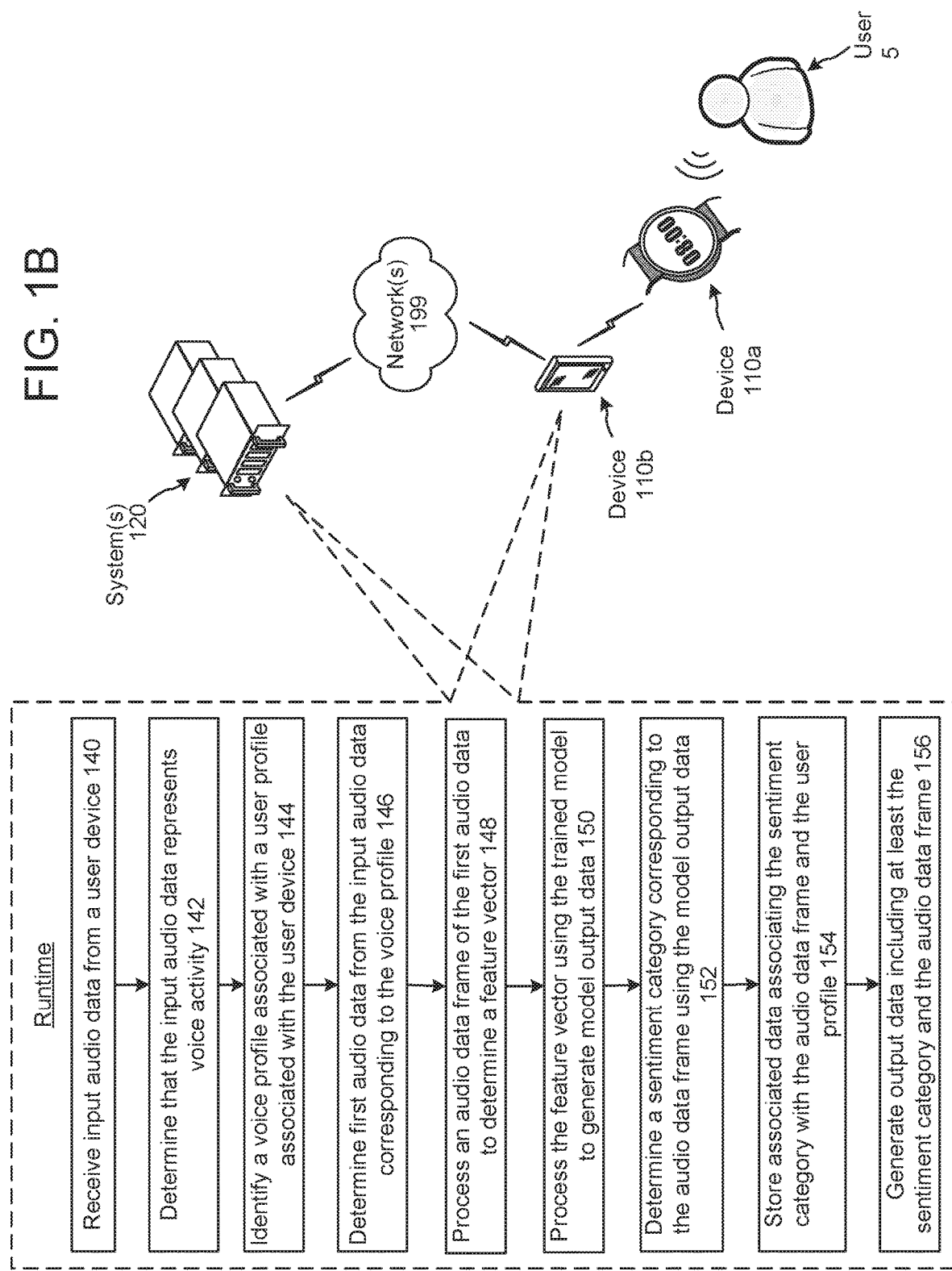

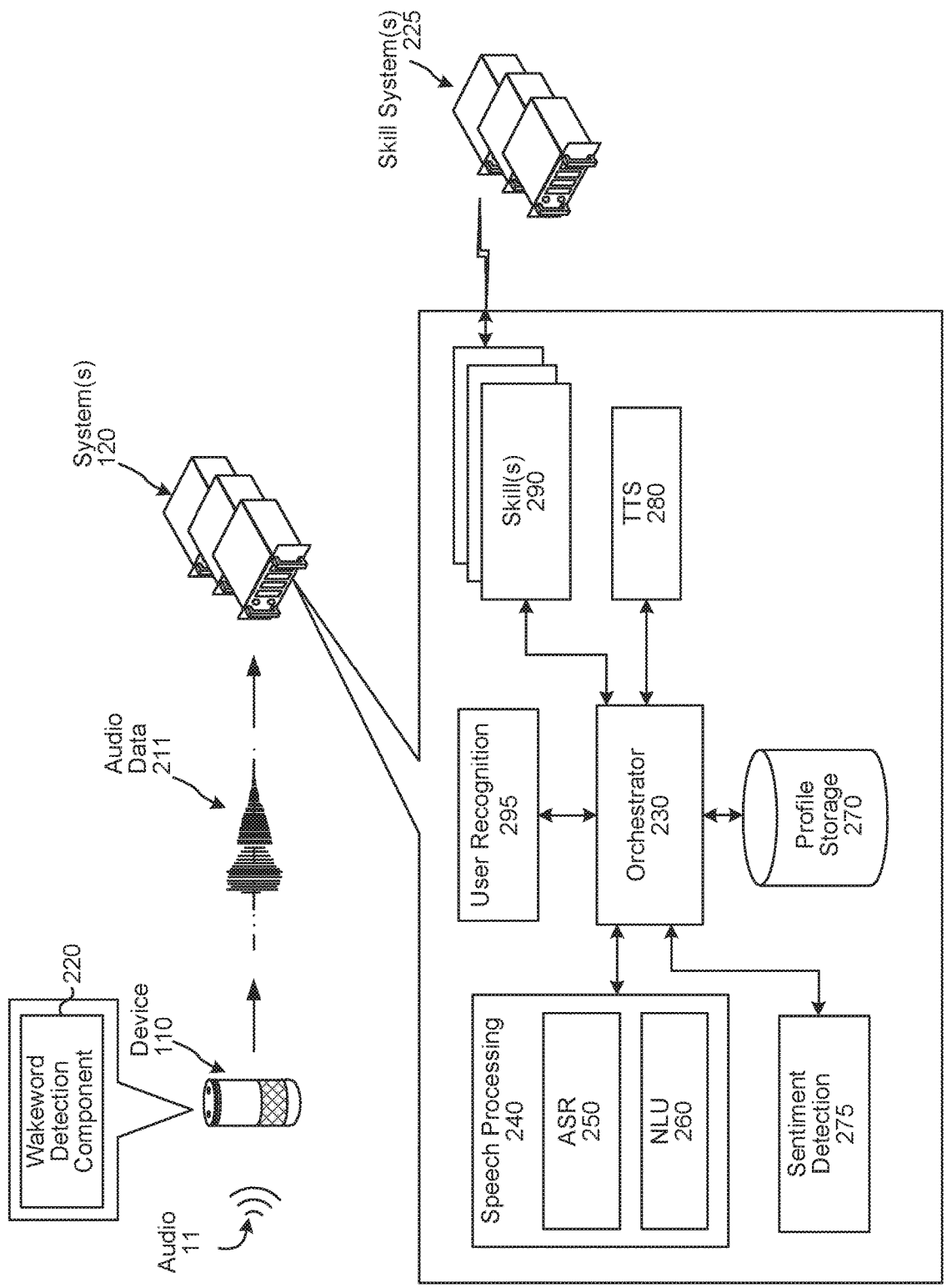

SENTIMENT DETECTION IN AUDIO DATA

BACKGROUND

Speech recognition systems have progressed to the point where humans can interact with computing devices using their voices. Such systems employ techniques to identify the words spoken by a human user based on the various qualities of a received audio input. The audio input may also sound different depending on the speaker's emotion when saying the words.

Computers, hand-held devices, telephone systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to train a system for detecting sentiment in audio data according to embodiments of the present disclosure.

FIG. 1B illustrates a system configured to detect sentiment in audio data according to embodiments of the present disclosure.

FIGS. 2A and 2B are conceptual diagrams of speech processing components of a system according to embodiments of the present disclosure.

DETAILED DESCRIPTION

Figure 2B:
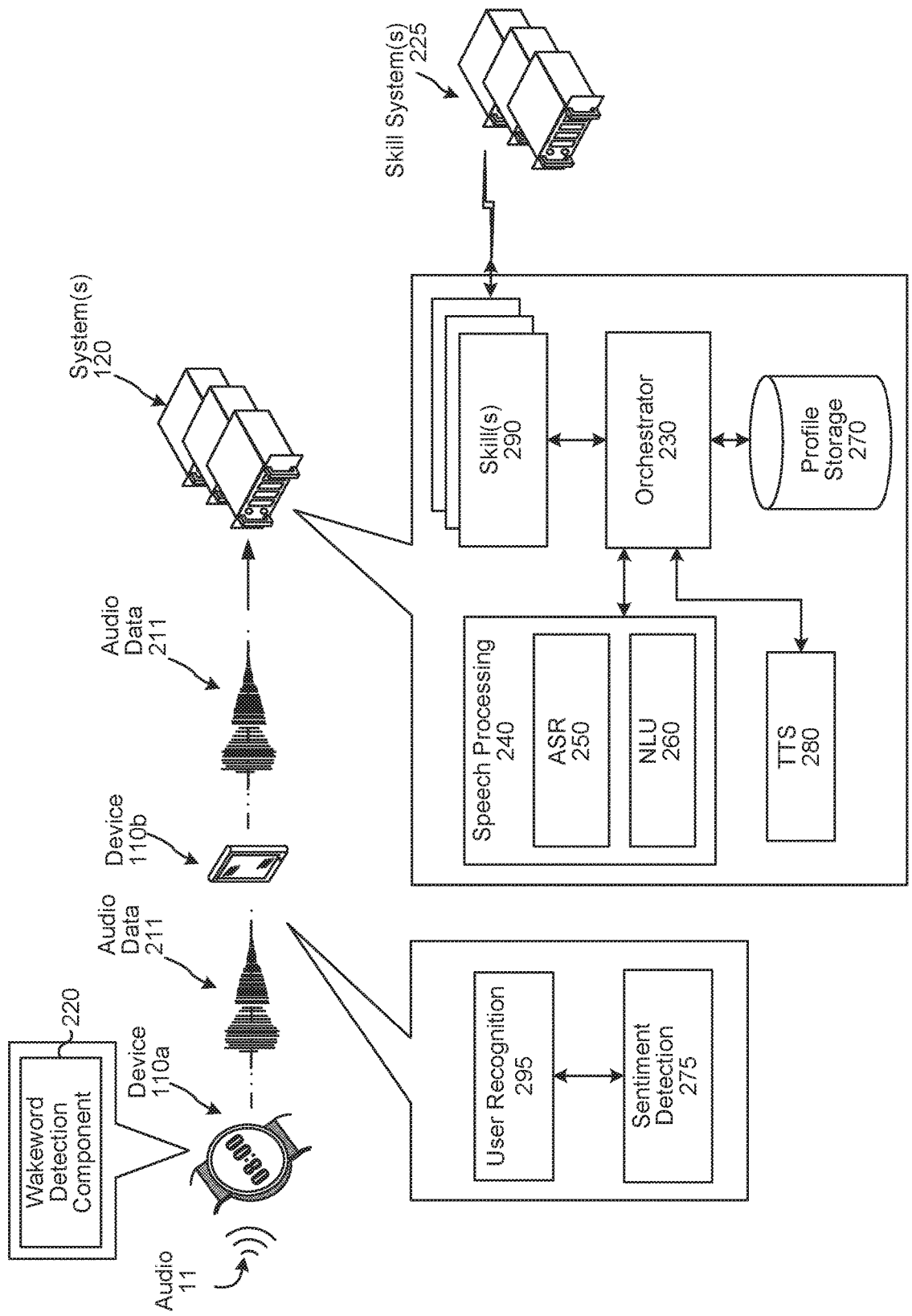

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play music," a system may output music. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

In some cases, it may be desirable to detect the emotion or other type of sentiment of a user while speaking to the system or to another person. For example, for the user input "Alexa, add an emoji," a system may output an emoji based on the user's sentiment detected from the audio data of the user input. In another example, the user may input "Alexa, recommend a movie," and the system may determine the user's present sentiment to recommend a movie corresponding to that sentiment. In other examples, the system may analyze speech data during a period of time, and determine a sentiment category at various time intervals to provide the user information on his or her emotional state during the period of time or while interacting with other persons. The system may analyze speech data while the user interacts with a device, and the sentiment category may indicate the user's satisfaction with his or her interactions with the device.

The speech sentiment recognition is performed in a supervised fashion using short, carefully segmented utterances, with labels that can take two formats—discrete categories such as happiness, sadness, anger and neutral, or continuous attributes such as activation (calm versus aroused), valence (negative versus positive) and dominance (weak versus strong).

Machine learning (ML), as discussed here in, refers to a computing technique that allows systems to learn ways to solve complex problems without needing an explicit algorithm for the system to follow. ML may use a trained model that consists of internally configured operations that can manipulate a particular type of input data to determine a desired result. Trained models can be used in many computing tasks such as computer vision, speech processing, predictive analyses, and many more.

Trained models may take a variety of forms including trained classifiers, support vector machines (SVMs), neural networks (such as deep neural networks (DNNs), recurrent neural networks (RNNs), or convolutional neural networks (CNNs)) and others. As an example, a neural network can include an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

The systems and methods described herein relate to sentiment detection in audio data. Exemplary embodiments may employ an adversarial autoencoder to train a ML model to perform variational inferences over the latent variables present in audio data and reconstruct the training input data using a decoder. Reconstruction of input data may be used as an auxiliary task to aid the primary task of sentiment recognition.

The systems and methods described herein can be used for sentiment detection in audio data. Exemplary embodiments may employ an adversarial autoencoder to train a ML model to perform variational inferences over the latent variables present in audio data. Using a decoder, the training input data can be reconstructed in some embodiments. Reconstruction of input data may be used as an auxiliary task to aid the primary task of sentiment recognition.

A speech signal can be produced via interaction of various latent factors including age, gender, emotional state, and content of speech. During training of the ML model, a variational approximation of the true posterior distribution of the latent variables can be performed. The latent variables may be split into a discrete component corresponding to the speaker's emotional state, and a continuous component capturing other latent speech attributes. The ML model can be trained to disentangle the discrete sentiment distribution from the continuous component distribution. In some embodiments, the input training audio data is then reconstructed from the approximated latent distributions. Besides the primary sentiment classification task, the variational inference of latent variables and reconstruction of the input signal representations can be used as unsupervised auxiliary tasks in training the ML model.

The sentiment detection system described herein may process input audio data to determine if the audio data includes voice activity from a human user. Then the system may identify portions of the input audio data that represents speech from a particular user. The portions of the input audio data may be processed using a trained ML model to predict a sentiment category for the audio data. The sentiment category may be used in various applications. For example, the sentiment category may be displayed to a user to indicate to his or her sentiments during interactions with other persons, or to indicate his or her sentiment during particular times of the day. The sentiment category may also be used by application developers for voice-activated systems or smart speaker systems to identify emotions or sentiments of a user while interacting with the voice-activated system or smart speaker system. The application developer may be able to determine a user's satisfaction of his or her interactions with the voice-activated system or smart speaker system.

In an example embodiment, a user may be wearing or carrying a device that detects audio data and initiates analysis of the audio data when voice activity is detected. The user may configure the device to monitor his or her speech interactions with other persons throughout the day. The sentiment detection system may determine an emotional state of the user for various interactions, and generate a periodic report for the user.

FIG. 1A illustrates a system configured to train a system to detect sentiment in audio data according to embodiments of the present disclosure. FIG. 1B illustrates a system configured to detect sentiment in audio data according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1A, the system may include one or more system(s) 120 in communication with a training data storage 125. As illustrated in FIG. 1B, the system may include a device 110 local to a user 5, and one or more systems 120 connected across one or more networks 199. The device 110a may be in communication with device 110b. As illustrated, the processes described with respect to FIG. 1A may be performed during training operations and processes described with respect to FIG. 1B may be performed during runtime operations.

As shown in FIG. 1A, the system(s) 120 processes (130) training data using an encoder to determine trained model output data. The system(s) 120 may be in communication with training data storage 125 directly or via network(s) 199. The training data may be stored in the training data storage 125 and may include audio data representing speech/utterances spoken by different persons and expressing a variety of sentiments. The training data may include labels or annotations indicating a sentiment corresponding to each audio frame (e.g., 20 ms) or each utterance in the training data. The encoder may be encoder 1010 described herein. In an example embodiment, the encoder may be a ML model, such as a neural network (e.g., a fully-connected neural network, a convolutional neural network or a recurrent neural network). The encoder may include model weights or parameters learned during the training operations described herein. The trained model output data may include one or more scores, which may be used to classify audio data into sentiment categories. The trained model output data may include a first portion representing one or more sentiment categories (e.g., 1014) and a second portion representing one or more speech attributes (e.g., 1018). The speech attributes may include content of the speech, speaker attributes such as, age, gender, accent and other traits personal to the speaker that may be estimated by the model, speech and/or environmental conditions (e.g., noisy, quiet, etc.), or other attributes.

The system(s) 120 processes (132) the trained model output data using a decoder to determine a reconstructed audio signal. The decoder may be a ML model similar to the ML model of the encoder. The system(s) 120 analyzes (134) the reconstructed audio signal with the training data to determine similarity data. For example, the system(s) 120 may analyze one or more signal features of the reconstructed audio signal with the respective audio signal of the training data to determine similarities or differences between the two, and the goal being that the input audio signal processed by the encoder is substantially similar to the reconstructed audio signal generated by the decoder.

The system(s) 120 determine (136) an updated encoder using the second portion of the trained model output data corresponding to the speech attributes and using the similarity data. For example, the system(s) 120 may update or modify the weights or parameters of the encoder based on the speech attributes included in the trained model output data. The system(s) 120 may also update or modify the weights or parameters of the encoder based on the similarity data comparing the reconstructed audio signal and the training data. The system(s) 120 stores (138) the updated encoder as the trained model.

The operations 130, 132, 134, 136 and 138 may be performed during training of a ML model to detect sentiment in audio data. Further details of these operations are described in connection with FIGS. 10 and 11. The training operations are performed prior to runtime to determine the trained model to detect sentiment in audio data.

During runtime, as shown in FIG. 1B, system(s) 120 receives (140) input audio data from a user device (e.g., device 110*a*). The input audio data may be captured by the device 110*a* and may include speech or sounds from the user 5 and/or speech and sounds from at least one other person. The device 110*a* may be in communication with a device 110*b*, and may send the input audio data to the device 110*b*. FIG. 1B shows device 110*a* as a smartwatch, however, device 110*a* may be any wearable device or any device carried by the user 5 and configured to capture audio data when the appropriate user permissions are met. The device 110*b* is shown as a smartphone, however, device 110*b* may be any mobile device or computing device such as a laptop, tablet, desktop, etc. that is in communication with the device 110*a* and configured to receive data from and send data to device 110*a*. Alternatively, the device 110*a* may be a voice-activated system or smartspeaker, and may send input audio data directly to the system(s) 120 rather than forwarding via a device 110*b*. Alternatively the operations of devices 110*a* and 110*b* may be combined into a single device.

The system(s) 120 determines (142) that the input audio data represents voice activity from a human. Continuing on FIG. 1B, the system(s) 120 identifies (144) a voice profile associated with a user profile of the device 110. The system(s) 120 may retrieve stored data associated with the user profile. The stored data may include a voice fingerprint or voice biomarker to identify a user using the audio data. In other embodiments, the stored data may include a RF data, location data, machine vision data, and the like described in connection with user recognition component 295. The system(s) 120 may identify the voice profile using the user recognition component 295 described herein.

The system(s) 120 determines (146) first audio data from the input audio data, where the first audio data corresponds to the voice profile. For example, the input audio data may capture speech from multiple persons, especially if user 5 is conversing with another person. The system(s) 120 may isolate the first audio data associated with speech spoken by user 5, and store the first audio data for further analysis. The system(s) 120 may determine an audio data frame from the first audio data. The audio data frame may be a segment of audio data corresponding to, for example, 20 ms portions of the first audio data. Multiple audio data frames may be determined from the first audio data, each of 20 ms length derived in 10 ms sliding windows.

The system(s) 120 processes (148) the audio data frame to determine a feature vector. The system(s) 120 may process the audio data frame using an encoder 650 described below to extract features from the audio data frame and generate the feature vector. The system(s) 120 processes (150) the feature vector using the trained model to generate model output data. The trained model is determined during the training operations described above. The system(s) 120 determines (152) a sentiment category corresponding to the audio data frame using the model output data. The model output data may include one or more scores indicating a sentiment category for the audio data frame.

The sentiment categories may include broad categories of positive, neutral, and negative. In another embodiment, the sentiment categories may include activation, valence and dominance, and may include a rating of positive, neutral or negative for each category. In yet another embodiment, the sentiment category may be a rating between the numbers 1 and 5. In yet another embodiment, the sentiment category may be a rating between the numbers 1 and 7. In one embodiment, the sentiment category may include a numeric rating (between 1 and 5 or between 1 and 7) for each of activation, dominance and valence. In another embodiment, the sentiment categories may include anger, sad, happy, surprised, stress, and disgust.

The system(s) 120 stores (152) association data associating the sentiment category with the audio data frame and the user profile. In an example embodiment, the system(s) 120 may analyze input audio data during a period of time, and determine a sentiment category at various time intervals to provide the user information on his or her emotional state during the period of time or while interacting with other persons. In another embodiment, the system(s) 120 may analyze input audio data while the user interacts with the device 110, and the sentiment category may indicate the user's satisfaction with his or her interactions with the device 110.

The system(s) 120 generates (156) output data including at least the sentiment category and the audio data frame. The system(s) 120 may determine text data corresponding to the audio data frame using the ASR processing techniques described below. The system(s) 120 may also determine time data indicating when the audio data frame is received by the device 110. The output data may include the text data corresponding to the utterance and/or audio frame data, the time data, an indicator of the sentiment category, and/or other information. For example, the output data may include a message such as "when you said [statement] at [time] we detected that you were [sentiment]." The output data may be displayed on a user device 110*a* or the device 110*b*. The indicator of the sentiment category may be text representing the sentiment category, an icon representing the sentiment category, or other indicators.

The operations of FIG. 1B are generally described herein as being performed by the system(s) 120. However, it should be understood that one or more of the operations may also be performed by the device 110*a*, device 110*b*, or other device.

Further details of the runtime operations are described in connection with FIG. 5. It should be noted that the speech attributes determined during training operations may only be used to update/train the ML model, and speech attributes for input audio data may not be outputted by the trained model during runtime operations.

In an example embodiment, the system(s) 120 processes, using the trained model, audio frame-level feature vectors derived from audio data frames of the first audio data. In another embodiment, the system(s) 120 processes, using the trained model, utterance-level feature vectors representing features of an entire utterance represented in the first audio data.

The overall system of the present disclosure may operate using various components as illustrated below. The various components may be located on same or different physical devices. Communication between various components may occur directly or across a network(s) 199.

As shown in FIGS. 2A and 2B, an audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120 as shown in FIG. 2A. As shown in FIG. 2B, the device 110a may transmit audio 11 to device 110b, and the device 110b may transmit audio data 211 to the system(s) 120. The audio data 211 may include data corresponding to the wakeword, or the portion of the audio corresponding to the wakeword may be removed by the device 110a prior to sending the audio data 211 to the system(s) 120. In some embodiments, the device 110a may begin transmitting audio data 211 to system(s) 120/device 110b (or otherwise performing further processing on audio data) in response to an event occurring or an event being detected by the device 110a.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 transcribes the input audio data 211 into input text data representing one or more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights,"

the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may also include a sentiment detection component 275 that may be configured to detect a sentiment of a user from audio data representing speech/utterances from the user. The sentiment detection component 275 may be included in the speech processing component 240 or may be a separate component as illustrated in FIG. 2A. The sentiment detection component 275 and other components are generally described as being operated by the system(s) 120. However, the device 110 may also operate one or more of the components, including the sentiment detection component 275.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
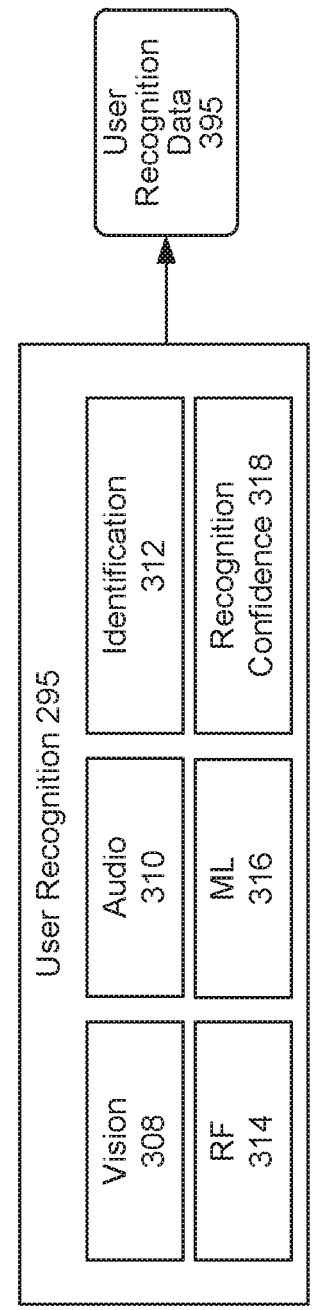
FIG. 3 is a schematic diagram of an illustrative architecture in which sensor data is combined to recognize one or more users according to embodiments of the present disclosure.

The system(s) 120 may include a user recognition component 295 that recognizes one or more users using a variety of data. As illustrated in FIG. 3, the user recognition component 295 may include one or more subcomponents including a vision component 308, an audio component 310, a identification component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user the user recognition component 295 believes originated data input to the system(s) 120. The user recognition data 395 may be used to inform processes performed by various components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system(s) 120.

The overall system of the present disclosure may include biometric sensors that transmit data to the identification component 312. For example, the identification component 312 may receive data corresponding to fingerprints, iris or retina scans, thermal scans, weights of users, a size of a user, pressure (e.g., within floor sensors), etc., and may determine a profile corresponding to a user. The identification component 312 may distinguish between a user and sound from a television, for example. Thus, the identification component 312 may incorporate identification information into a confidence level for determining an identity of a user. Identification information output by the identification component 312 can be associated with specific user profile data such that the identification information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the system(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

As shown in FIG. 2B, the sentiment detection component 275 and the user recognition component 295 may be included in the device 110b. The device 110 may transmit audio data 211 to device 110b. Upon receipt, the device 110b may send the audio data 211 to the user recognition component 295 to perform the operations described herein in relation to component 295, for example, including identifying a user profile corresponding to the audio data 211. The user recognition component 295 may send data to the sentiment detection component 275 to perform operations described herein.

Figure 4:
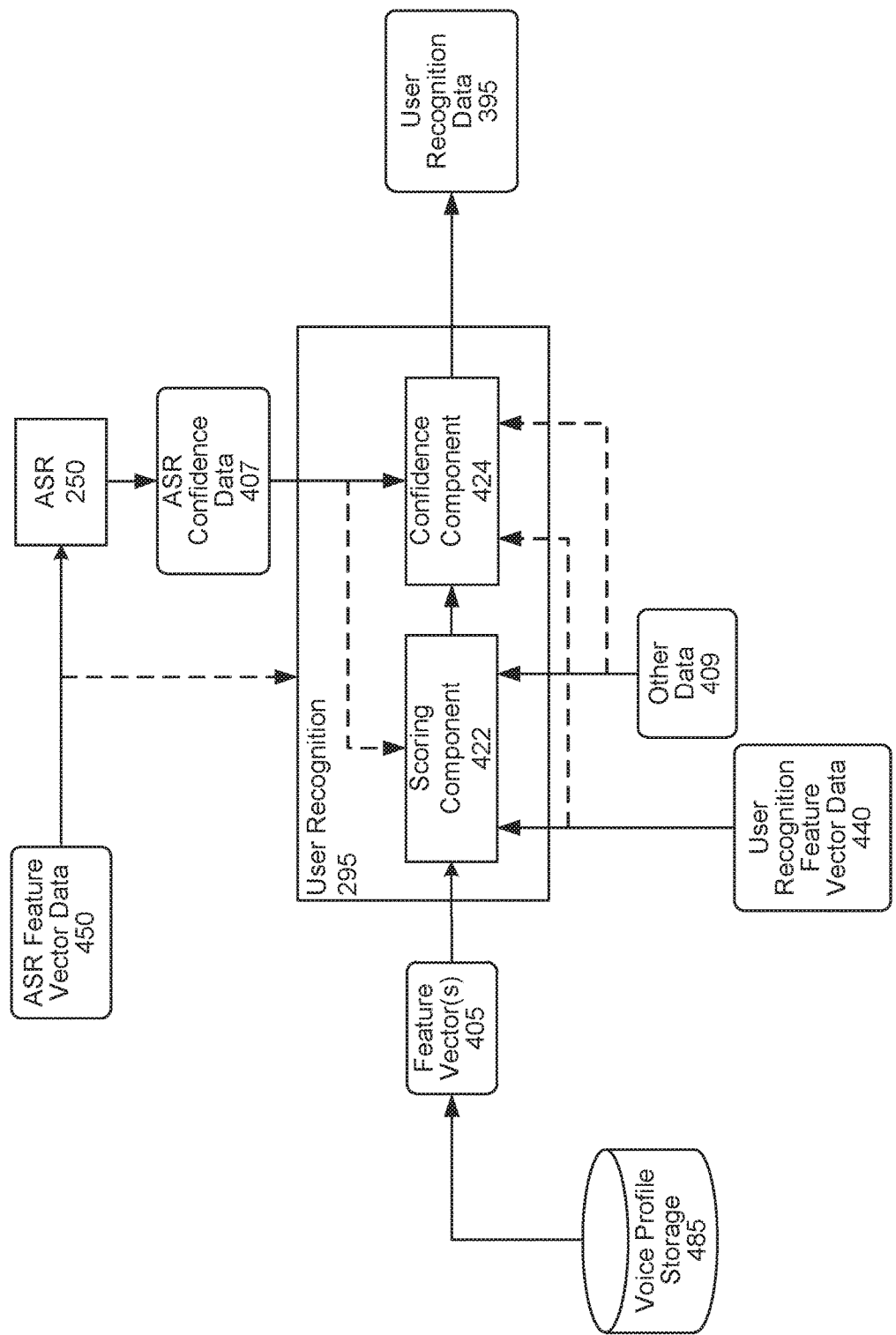
FIG. 4 is a system flow diagram illustrating user recognition according to embodiments of the present disclosure.

FIG. 4 illustrates user recognition processing as may be performed by the user recognition component 295. The ASR component 250 performs ASR processing on ASR feature vector data 450. ASR confidence data 407 may be passed to the user recognition component 295.

The user recognition component 295 performs user recognition using various data including the user recognition feature vector data 440, feature vectors 405 representing voice profiles of users of the system(s) 120, the ASR confidence data 407, and other data 409. The user recognition component 295 may output the user recognition data 395, which reflects a certain confidence that the user input was spoken by one or more particular users. The user recognition data 395 may include one or more user identifiers (e.g., corresponding to one or more voice profiles). Each user identifier in the user recognition data 395 may be associated with a respective confidence value, representing a likelihood that the user input corresponds to the user identifier. A confidence value may be a numeric or binned value.

The feature vector(s) 405 input to the user recognition component 295 may correspond to one or more voice profiles. The user recognition component 295 may use the feature vector(s) 405 to compare against the user recognition feature vector 440, representing the present user input, to determine whether the user recognition feature vector 440 corresponds to one or more of the feature vectors 405 of the voice profiles. Each feature vector 405 may be the same size as the user recognition feature vector 440.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system(s) 120 may determine a group profile identifier associated with the device identifier, may determine user identifiers associated with the group profile identifier, and may include the group profile identifier and/or the user identifiers in the metadata. The system(s) 120 may associate the metadata with the user recognition feature vector 440 produced from the audio data 211. The user recognition component 295 may send a signal to voice profile storage 485, with the signal requesting only audio data and/or feature vectors 405 (depending on whether audio data and/or corresponding feature vectors are stored) associated with the device identifier, the group profile identifier, and/or the user identifiers represented in the metadata. This limits the universe of possible feature vectors 405 the user recognition component 295 considers at runtime and thus decreases the amount of time to perform user recognition processing by decreasing the amount of feature vectors 405 needed to be processed. Alternatively, the user recognition component 295 may access all (or some other subset of) the audio data and/or feature vectors 405 available to the user recognition component 295. However, accessing all audio data and/or feature vectors 405 will likely increase the amount of time needed to perform user recognition processing based on the magnitude of audio data and/or feature vectors 405 to be processed.

If the user recognition component 295 receives audio data from the voice profile storage 485, the user recognition component 295 may generate one or more feature vectors 405 corresponding to the received audio data.

The user recognition component 295 may attempt to identify the user that spoke the speech represented in the audio data 211 by comparing the user recognition feature vector 440 to the feature vector(s) 405. The user recognition component 295 may include a scoring component 422 that determines respective scores indicating whether the user input (represented by the user recognition feature vector 440) was spoken by one or more particular users (represented by the feature vector(s) 405). The user recognition component 295 may also include a confidence component 424 that determines an overall accuracy of user recognition processing (such as those of the scoring component 422) and/or an individual confidence value with respect to each user potentially identified by the scoring component 422. The output from the scoring component 422 may include a different confidence value for each received feature vector 405. For example, the output may include a first confidence value for a first feature vector 405a (representing a first voice profile), a second confidence value for a second feature vector 405b (representing a second voice profile), etc. Although illustrated as two separate components, the scoring component 422 and the confidence component 424 may be combined into a single component or may be separated into more than two components.

The scoring component 422 and the confidence component 424 may implement one or more trained machine learning models (such as neural networks, classifiers, etc.) as known in the art. For example, the scoring component 422 may use probabilistic linear discriminant analysis (PLDA) techniques. PLDA scoring determines how likely it is that the user recognition feature vector 440 corresponds to a particular feature vector 405. The PLDA scoring may generate a confidence value for each feature vector 405 considered and may output a list of confidence values associated with respective user identifiers. The scoring component 422 may also use other techniques, such as GMMs, generative Bayesian models, or the like, to determine confidence values.

The confidence component 424 may input various data including information about the ASR confidence 407, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 424 may also consider the confidence values and associated identifiers output by the scoring component 422. For example, the confidence component 424 may determine that a lower ASR confidence 407, or poor audio quality, or other factors, may result in a lower confidence of the user recognition component 295. Whereas a higher ASR confidence 407, or better audio quality, or other factors, may result in a higher confidence of the user recognition component 295. Precise determination of the confidence may depend on configuration and training of the confidence component 424 and the model(s) implemented thereby. The confidence component 424 may operate using a number of different machine learning models/techniques such as GMM, neural networks, etc. For example, the confidence component 424 may be a classifier configured to map a score output by the scoring component 422 to a confidence value.

The user recognition component 295 may output user recognition data 395 specific to a one or more user identifiers. For example, the user recognition component 295 may output user recognition data 395 with respect to each received feature vector 405. The user recognition data 395 may include numeric confidence values (e.g., 0.0-1.0, 0-1000, or whatever scale the system is configured to operate). Thus, the user recognition data 395 may output an n-best list of potential users with numeric confidence values (e.g., user identifier 123—0.2, user identifier 234—0.8). Alternatively or in addition, the user recognition data 395 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 395 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 424 may determine the overall confidence value.

The confidence component 424 may determine differences between individual confidence values when determining the user recognition data 395. For example, if a difference between a first confidence value and a second confidence value is large, and the first confidence value is above a threshold confidence value, then the user recognition component 295 is able to recognize a first user (associated with the feature vector 405 associated with the first confidence value) as the user that spoke the user input with a higher confidence than if the difference between the confidence values were smaller.

The user recognition component 295 may perform thresholding to avoid incorrect user recognition data 395 being output. For example, the user recognition component 295 may compare a confidence value output by the confidence component 424 to a threshold confidence value. If the confidence value does not satisfy (e.g., does not meet or exceed) the threshold confidence value, the user recognition component 295 may not output user recognition data 395, or may only include in that data 395 an indicator that a user that spoke the user input could not be recognized. Further, the user recognition component 295 may not output user recognition data 395 until enough user recognition feature vector data 440 is accumulated and processed to verify a user above a threshold confidence value. Thus, the user recognition component 295 may wait until a sufficient threshold quantity of audio data of the user input has been processed before outputting user recognition data 395. The quantity of received audio data may also be considered by the confidence component 424.

The user recognition component 295 may be defaulted to output binned (e.g., low, medium, high) user recognition confidence values. However, such may be problematic in certain situations. For example, if the user recognition component 295 computes a single binned confidence value for multiple feature vectors 405, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 409 to inform user recognition processing. A trained model(s) or other component of the user recognition component 295 may be trained to take other data 409 as an input feature when performing user recognition processing. Other data 409 may include a variety of data types depending on system configuration and may be made available from other sensors, devices, or storage. The other data 409 may include a time of day at which the audio data 211 was generated by the device 110 or received from the device 110, a day of a week in which the audio data audio data 211 was generated by the device 110 or received from the device 110, etc.

The other data 409 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 440 and one or more feature vectors 405 to perform more accurate user recognition processing.

The other data 409 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 409 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 409 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 409 may include data representing activity of a particular user that may be useful in performing user recognition processing. For example, a user may have recently entered a code to disable a home security alarm. A device 110, represented in a group profile associated with the home, may have generated the audio data 211. The other data 409 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 409 and considered by the user recognition component 295.

Depending on system configuration, the other data 409 may be configured to be included in the user recognition feature vector data 440 so that all the data relating to the user input to be processed by the scoring component 422 may be included in a single feature vector. Alternatively, the other data 409 may be reflected in one or more different data structures to be processed by the scoring component 422.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
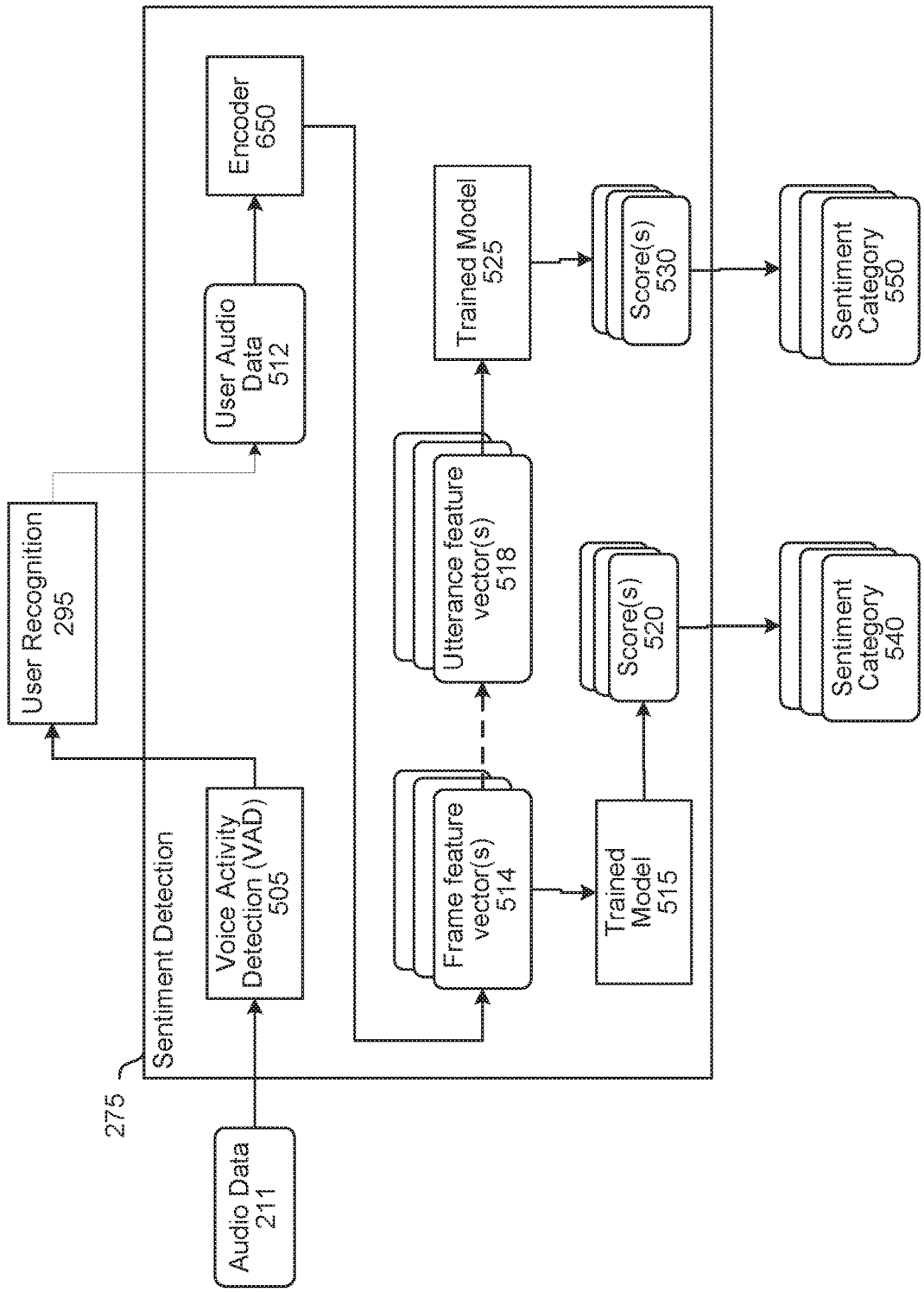
FIG. 5 is a conceptual diagram illustrating a sentiment detection component according to embodiments of the present disclosure.

FIG. 5 is a conceptual diagram illustrating a sentiment detection component 275 according to embodiments of the present disclosure. The sentiment detection component 275 may include a voice activity detection (VAD) component 505, a trained model component 515 and a trained model component 525. The audio data 211 captured by a device 110 may be inputted into the VAD component 505. The sentiment detection component 275 may reside with a device 110a, with another device proximate to, and in communication with device 110 such as device 110b or with a remote device such as with system(s) 120. If the sentiment detection component 275 does not reside on the device 110a that is capturing audio, the sentiment detection component 275 may not necessarily include the VAD component 505 (or may not necessarily include other components) and may or may not include other components as well. The precise composition of the sentiment detection component 275 depends on system configuration.

The VAD component 505 may determine if the audio data 211 includes speech spoken by a human or voice activity by a human, and may determine a portion of the audio data 211 that includes speech or voice activity. The VAD component 505 may send the portion of the audio data 211 including speech or voice activity to the user recognition component 295. The VAD component 505 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 505 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user recognition component 295 (which may be located on a same or different device as the sentiment detection component 275) may communicate with the sentiment detection component 275 to determine user audio data 512 that corresponds to a particular user profile. The user recognition component 295 may recognize one or more users as described in connection with FIGS. 3 and 4. For example, the user recognition component 295 may identify stored data corresponding to a voice profile associated with the user profile, and determine a confidence level that a portion of the input audio data corresponds to the voice profile based on analyzing the stored data. The user recognition component 295 may determine if the confidence level meets a threshold. If the confidence level for a portion of the input audio data is below a threshold, then the respective portion of input audio is discarded as it does not represent speech from the user associated with the user profile. If the confidence level for a portion of the input audio data meets a threshold, then the respective portion of the input audio data is stored as the user audio data 512.

The user audio data 512 may be a portion of the audio data 211 that includes speech or one or more utterances from a particular user associated with the user profile. In other words, audio data representing a particular user's speech may be isolated and stored as the user audio data 512 for further analysis. In an example embodiment, the user may be associated with or using the device 110, and may have provided permission to the system(s) 120 to record and analyze his or her voice/conversations to determine a sentiment category corresponding to the conversation.

Prior to performing further analysis on the user audio data 512, the sentiment detection component 275 may confirm that the user has granted permissions to analyze speech spoken by the user for sentiment detection.

The user audio data 512 may be inputted into an encoder 650 (described further in relation to FIG. 6) to determine frame feature vector(s) 514. The frame feature vector(s) 514 may represent audio frame level features extracted from the user audio data 512. One frame feature vector 514 may represent audio frame level features for an audio frame of 20 ms of the user audio data 512. The frame feature vector(s) 514 may be derived by spectral analysis of the user audio data 512.

In an example embodiment, the sentiment detection component 275 determines that the user audio data 512 includes an entire utterance. That is, the sentiment detection component 275 may determine that a beginpoint of the user audio data 512 corresponds to a beginpoint of an utterance, and an endpoint of the user audio data 512 corresponds to an endpoint of the utterance. In some embodiments, the frame feature vector(s) 514 may be used to determine utterance feature vector(s) 518 representing utterance-level features of one or more utterances represented in the user audio data 512. The utterance feature vector(s) 518 may be determined by performing statistics calculations, delta calculation and other processing on the frame feature vector(s) 514 for the audio frames corresponding to an utterance of interest. As such, the utterance feature vector(s) 518 may be a feature matrix whose dimensions are based on the number of audio frames corresponding to the utterance of interest and the dimension of the corresponding frame feature vector 514. The utterance feature vector(s) 518 may be a high-level function or other mathematical functions representing the utterance-level features.

The trained model component 515 may process the frame feature vector(s) 514 using a convolutional neural network trained according to the process and architecture described in connection with FIGS. 10 and 11. The trained model component 515 may output score(s) 520 indicating a sentiment category 540 for the user audio data 512. The sentiment detection component 275 may predict one of three sentiment categories 540, 550. In an example embodiment, the sentiment category 540, 550 may be determined after score(s) 520, 530 have been determined for a particular period of time of input audio data. In an example embodiment, the sentiment categories may be broad such as positive, neutral, and negative or may be more precise such as angry, happy, distressed, surprised, disgust, or the like.

The trained model component 525 may process the utterance feature vector(s) 518 using a fully-connected neural network trained according to the process and architecture described in connection with FIGS. 10 and 11. The trained model component 525 may output score(s) 530 indicating a sentiment category 550 for the user audio data 512. The sentiment category 550 may be determined after score(s) 530 are determined for an entire sentence.

Figure 7:
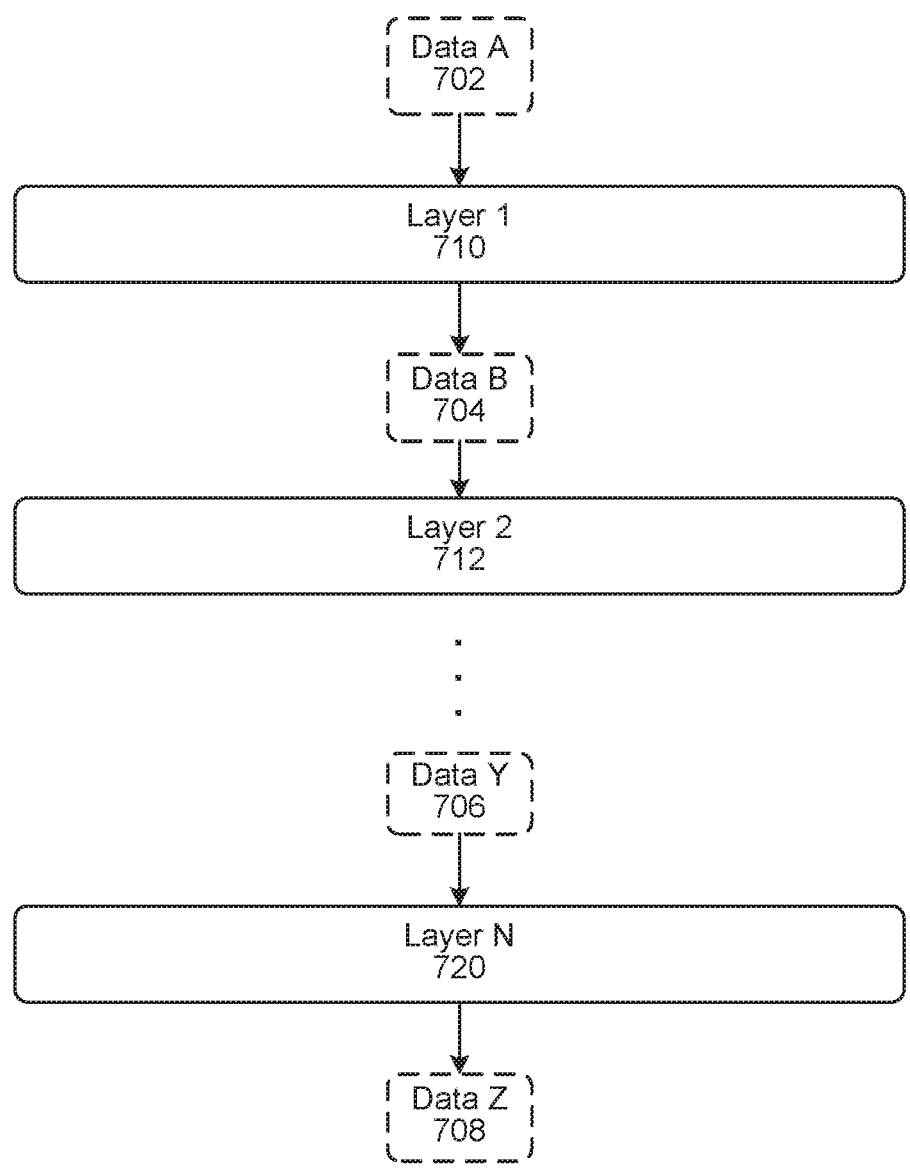
FIG. 7 is a conceptual diagram illustrating layers of a trained model according to embodiments of the present disclosure.

The machine learning model for the trained model component 515, 525 may take many forms, including a neural network. The trained model component 515 may employ a convolutional neural network. The trained model component 525 may employ a fully-connected neural network. As illustrated in FIG. 7, a neural network may include a number of layers, from input layer 1 710 through output layer N 720. Each layer includes one or more nodes and is configured to input a particular type of data and output another type of data. A layer may be represented by a data structure that represents the connections between layers and operations within a layer. The neural network illustrated in FIG. 7 is configured to input data of type data A 702 (which is the input to layer 1 710) and output data of type data Z 708 (which is the output from the last layer N 720). The output from one layer is then taken as the input to the next layer. For example, the output data (data B 704) from layer 1 710 is the input data for layer 2 712 and so forth such that the input to layer N 720 is data Y 706 output from the penultimate layer (not shown).

While values for the input data/output data of a particular layer are not known until a neural network is actually operating during runtime, the data describing the neural network describes the structure and operations of the layers of the neural network.

Figure 6:
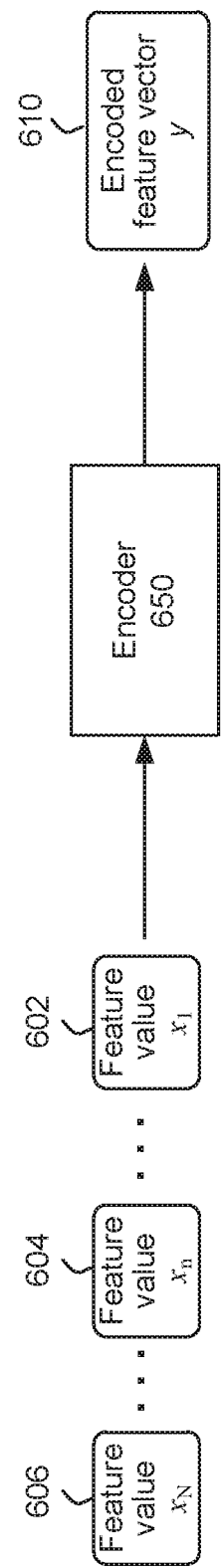
FIG. 6 illustrates operation of an encoder according to embodiments of the present disclosure.

FIG. 6 illustrates feature data values 602-606 being processed by an encoder 650 to generate an encoded feature vector y. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence toy, with y being a F-dimensional vector. F is a fixed length of the vector and is configurable depending on user of the encoded vector and other system configurations. Any particular encoder 650 will be configured to output vectors of the same size, thus ensuring a continuity of output encoded vector size from any particular encoder 650 (though different encoders may output vectors of different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder may be implemented as a recurrent neural network (RNN), for example as a long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward),
  bi-linear, essentially the concatenation of a forward and a backward embedding, or
  tree, based on parse-tree of the sequence.

In addition, an attention model can be used, which is another RNN or DNN that learns to "attract" attention to certain parts of the input. The attention model can be used in combination with the above methods of consuming the input.

FIG. 6 illustrates operation of the encoder 650. The input feature value sequence, starting with feature value $x_1$ 602, continuing through feature value $x_n$ 604 and concluding with feature value $x_N$ 606 is input into the encoder 650. The encoder 650 may process the input feature values as noted above. The encoder 650 outputs the encoded feature vector y 610, which is a fixed length feature vector of length F. One or more encoders such as 650 may be used with the sentiment detection component 275.

Figure 8:
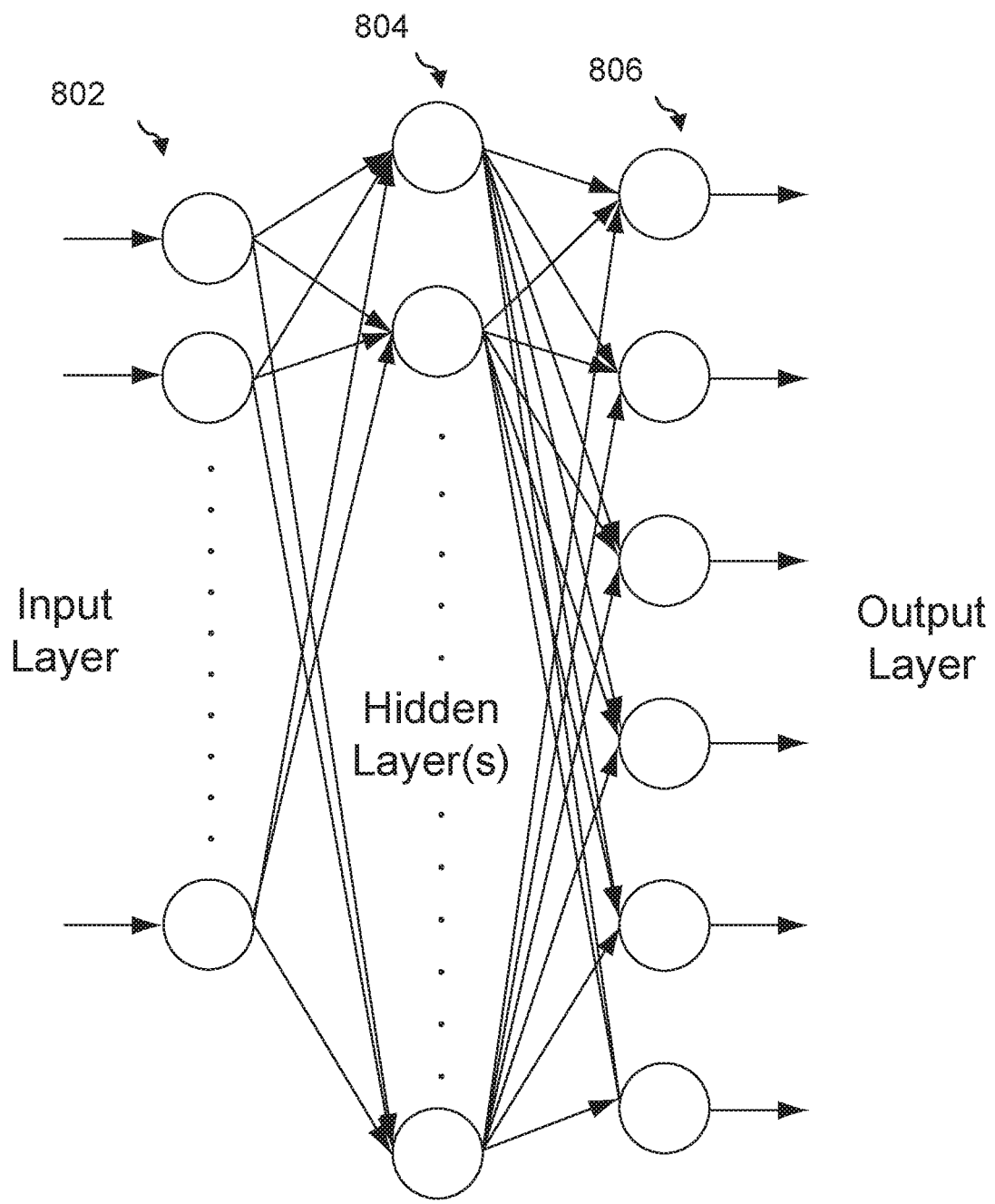
FIG. 8 illustrates a neural network such as one that may be used for sentiment detection according to embodiments of the present disclosure.

An example neural network for the trained model component 515, 525 is illustrated in FIG. 8. A neural network may be structured with an input layer 802, middle layer(s) 804, and an output layer 806. The middle layer(s) may also be known as the hidden layer(s). Each node of the hidden layer is connected to each node in the input layer and each node in the output layer. Although illustrated in FIG. 8 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 9:
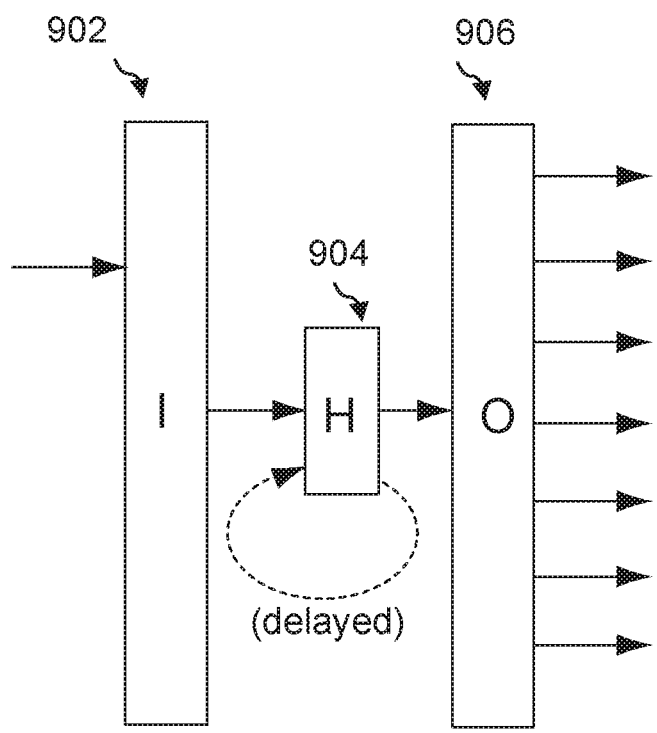
FIG. 9 illustrates a neural network such as one that may be used for sentiment detection according to embodiments of the present disclosure.

In one aspect, the neural network may be constructed with recurrent connections such that the output of the hidden layer of the network feeds back into the hidden layer again for the next set of inputs. Such a neural network is illustrated in FIG. 9. Each node of the input layer 902 connects to each node of the hidden layer 904. Each node of the hidden layer 904 connects to each node of the output layer 906. As illustrated, the output of the hidden layer 904 is fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 9, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 10:
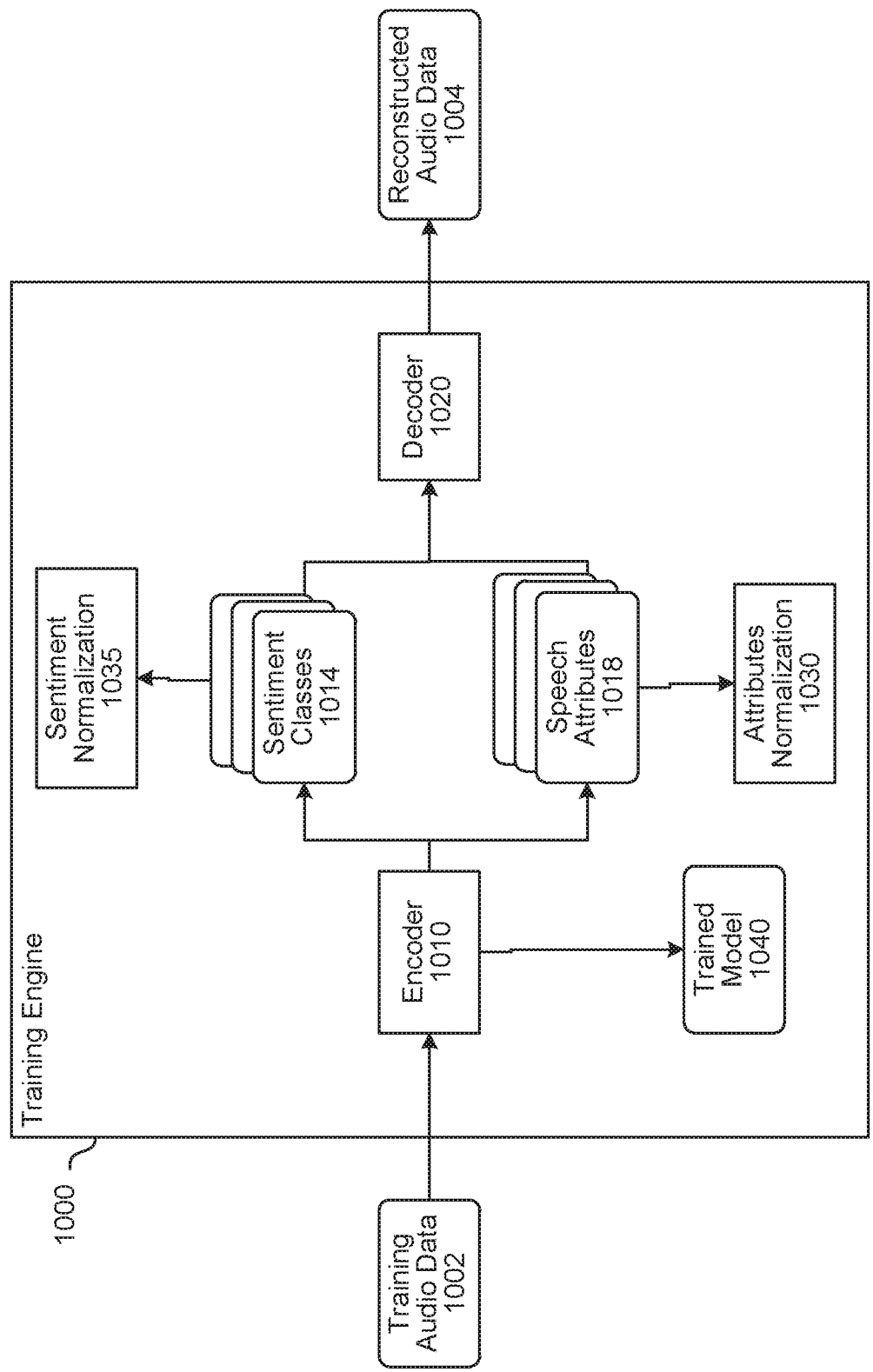
FIG. 10 is a conceptual diagram illustrating a training engine for training a model that may be used for sentiment detection according to embodiments of the present disclosure.

FIG. 10 is a conceptual diagram illustrating a training engine 1000 for the trained model of the sentiment detection component according to embodiments of the present disclosure. FIG. 11 is a conceptual diagram illustrating the training process for the trained model of the sentiment detection component according to embodiments of the present disclosure.

The training engine 1000 may include an encoder component 1010, a decoder component 1020, an attributes normalization component 1030, and a sentiment normalization component 1030. Training audio data 1002 may be inputted into the encoder component 1010, and the encoder component 1010 may output one or more scores indicating sentiment classes 1014 and speech attributes 1018 corresponding to the inputted training audio data. The sentiment classes 1014 and the speech attributes 1018 may inputted into the decoder component 1020 and the output of the decoder component 1020 may be reconstructed audio data 1004.

The encoder component 1010 may employ a machine learning algorithm, for example, a fully-connected neural network or a convolutional neutral network to process the training audio data 1002 and learn features, parameters and/or weights to generate a trained model 1040. The trained model 1040 may be generated after the encoder 1010 processes all of the training audio data 1002, which may require executing the encoder 1010 multiple times. In some embodiments, the encoder 1010 may use data outputted by the attributes normalization component 1030 and the sentiment normalization component 1035 to modify/update the trained model 1040. The encoder 1010 may also use the reconstructed audio data 1004 to modify/update the trained model 1040. For example, the training engine 1000 may compare the training audio data 1002 to the reconstructed audio data 1004 to determine if one or more parameters/weights of the trained model 1040 need to be modified/updated. The goal of the training engine 1000 may be to generate a trained model such that the reconstructed audio data 1004 is substantially similar to the training audio data 1002. The trained model 1040 may be stored in a data source for use at runtime by the trained model component 515 and/or the trained model component 525 of the sentiment detection component 275.

The training audio data 1002 may include one or more utterances spoken by various users, and may have a variety of attributes caused by the users' emotions or sentiment (e.g., sadness, happiness, excited, surprise, anger, depressed, scared, passive, aggressive, etc.) while speaking the utterances. In an example embodiment, the training audio data 1002 may be annotated/labeled for the following attributes: activation, valence, and dominance. The labels may be a real number between 1 and 5. The attributes may be divided into 3 classes, where data labeled 1 or 2 may be categorized as a low class, data labeled 3 may be categorized as a neutral class, and data labeled 4 or 5 may be categorized as a high class. For example, audio data representing an utterance may be labeled 2 for activation, thus categorized as having a low activation attribute.

Latent speech production factors include speaker's characteristics (age, gender, accent, and speaker traits), speaker's emotional state, and content of speech. The sentiment detection task may involve the inference of these latent variables. Given the observed variable x corresponding to the input audio data (1002 during training) and the hidden variables z (speech attributes 1018), then the inference of z given x may be based on the distribution $p_\theta(z|x)$ where θ models the data. The true posterior distribution $p_\theta(z|x)$ may be computationally intractable and may be approximated by the variational model $q_\phi(z|x)$. The goal may be to optimize such that $q_\phi(z|x) \approx p_\theta(z|x)$. The optimization may be conducted by minimizing the KL divergence between $q_\phi(z|x)$ and $p_\theta(z|x)$. This may lead to the formulation of the variational lower bound (Equation 1).
This is some test text $$KL(q_\phi z|x)\|p_\theta(z|x)) = \log p_\theta(x) - E_{q\phi(z|x)} [\log p_\theta(x|z)] + KL (q_\phi(z|x)\|p_\theta(z))$$ Equation 1, where $p_\theta(z)$ is a prior distribution over the latent variable z. Minimization of the divergence between the true and the approximate posterior may also decrease the difference between the marginal log-likelihood $\log p_\theta(x)$ and the variational lower bound $E_{q\phi(z|x)} [\log p_\theta(x|z)] + KL(q_\phi(z|x)\|p_\theta(z))$. The optimization process during training of the machine learning model may resemble an autoencoder training (φ parameterizes the encoder and θ parameterizes the decoder) as illustrated in FIG. 11, where the objective may be to maximize likelihood of generated data given the observed data x (training audio data 1002) per the below equation:

$$\max_{\phi,\theta} E_{pD(x)} E_{q\phi(z|x)}[\log p_\theta(x|z)] - KL(q_\phi(z|x)\|p_\theta(z))$$ Equation 2

The second term in Equation 2 may act as a regularizer that forces the approximate posterior to match a prior distribution. Given enough capacity the encoder θ may be able to produce a distribution that matches the true posterior and the decoder may be able to generate data likely to be seen in the dataset. In an example embodiment, an adversarial autoencoder may be employed by the training engine 1000 to optimize Equation 2.

The first term in Equation 2 may represent the reconstruction loss of the autoencoder. The second term of Equation 2 may be optimized through adversarial training. The trained model 1040 may learn to discriminate between 'true' samples sampled from $p_\theta(z)$ and 'fake' samples sampled from an aggregated posterior $q_\phi(z)$. This type of adversarial training may produce a posterior distribution that better matches the prior distribution. With this type of adversarial training a sample (e.g., 1120) from the two competing distributions is needed, whereas directly minimizing the KL divergence may require a prior knowledge of the functional form for the loss. This may allow the training engine 1000 the flexibility of choosing any distribution for the prior $p_\theta(z)$.

Figure 11:
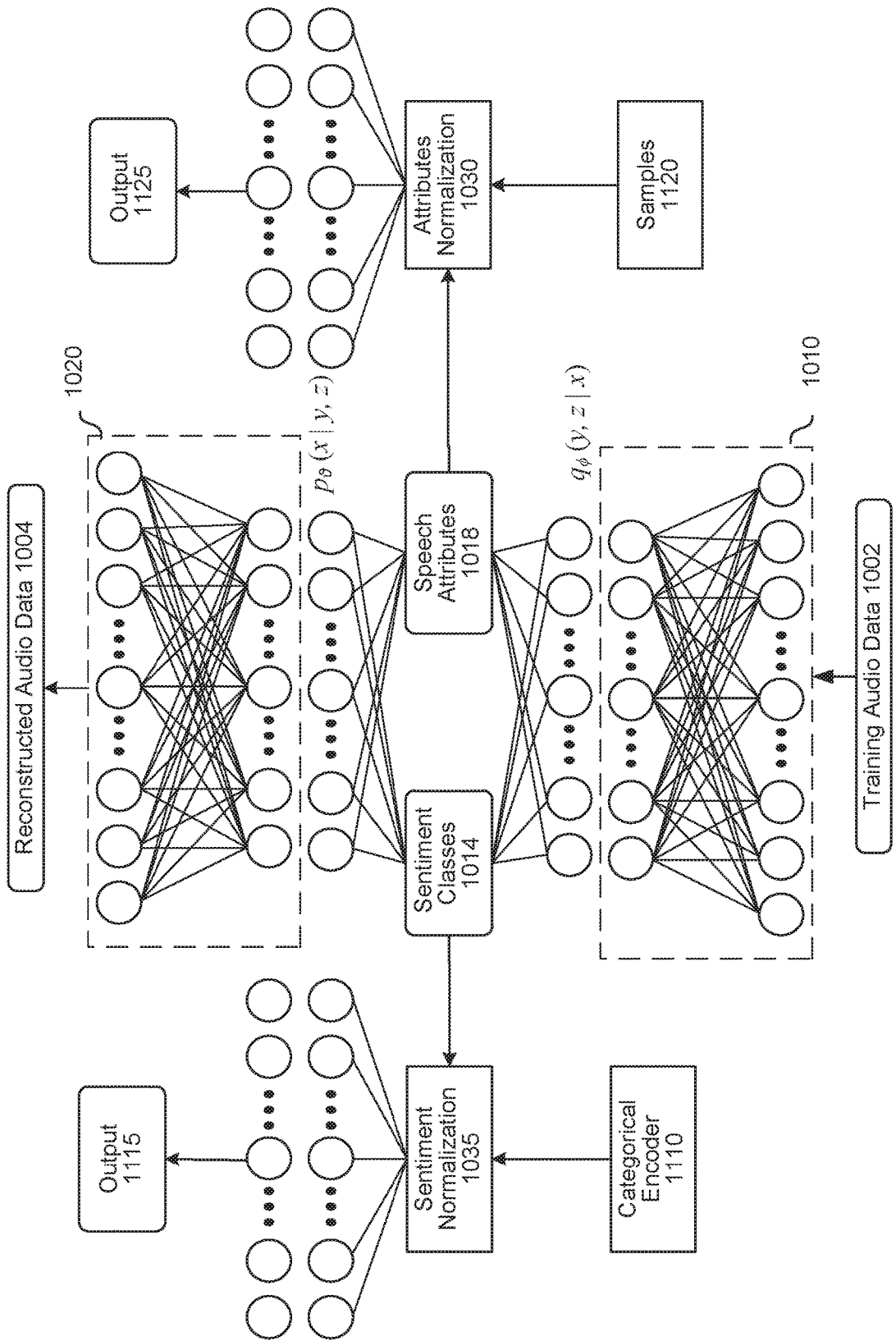
FIG. 11 is a conceptual diagram illustrating a training process for training a model that may be used for sentiment detection component according to embodiments of the present disclosure.

FIG. 11 illustrates an exemplary architecture for the training engine 1000. The encoder 1010 may map the training audio data 1002 (represented by x in the equations) to the latent space which may be divided into two components—a discrete component representing the sentiment classes 1014 (represented by y in the equations) that captures the sentiment variability in speech and a continuous component represented by the speech attributes 1018 (represented by z in the equations) that captures all the other speech variabilities. The speech attributes 1018 may correspond to the content of the speech and the speaker's traits such as age, gender, accent and other personal traits. The posterior distribution outputted by the encoder 1010 is denoted $q_\phi(y, z|x)$. The aggregated posteriors $q_\phi(y)$, $q_\phi(z)$ may be matched to a categorical and a Gaussian prior. The categorical encoder $q_\phi(y|x)$ (1110) may also represent the sentiment classifier. The decoder $p_\theta(x|y, z)$ may then map the joint latent space back to the data distribution.

The training of the trained model 1040 may be performed in three phases. First, in the reconstruction phase, the trained model 1040 may be trained from top to bottom by minimizing a reconstruction loss between the reconstructed audio data 1004 and the training audio data 1002. The second phase is a regularization phase executed by the attributes normalization component 1030 where both posterior distributions may be matched to their respective priors by training adversarial networks. The attributes normalization component 1030 may use samples 1120 determined by a Gaussian distribution $p_\theta(z) \sim \mathcal{N}(0,1)$. The attributes normalization component 1030 may perform the adversarial training portion of the training engine 1000 using two 256-node layers and output data 1125. In the third phase, the sentiment normalization component 1035 may train the categorical encoder $q_\phi(y|x)$ (1110) using a cross entropy loss between the sentiment labels/classes 1014 predicted by the encoder 1010 and the true sentiment labels determined from the annotations/labels of the training audio data 1002. The sentiment normalization component 1035 may perform the adversarial training portion of the training engine 1000 using two 256-node layers and output data 1115. The second and third phase of training may normalize the trained model 1040 to remove biases or account for biases present in the training audio data 1002. This framework may be used in a semi-supervised setting when limited labeled training data is available. The reconstruction and regularization phases may be learned without the sentiment labels of the training audio data 1002 and therefore may be unsupervised with respect to the primary task.

In an example embodiment, the trained model 1040 may be a 2-layer convolutional connected neural network with 256 nodes per layer. The number of sentiment classes 1014 predicted by the encoder 1010 may be three. That is, the trained model 1040 may be trained to classify input audio data into one of three sentiment classes/categories.

Figure 12:
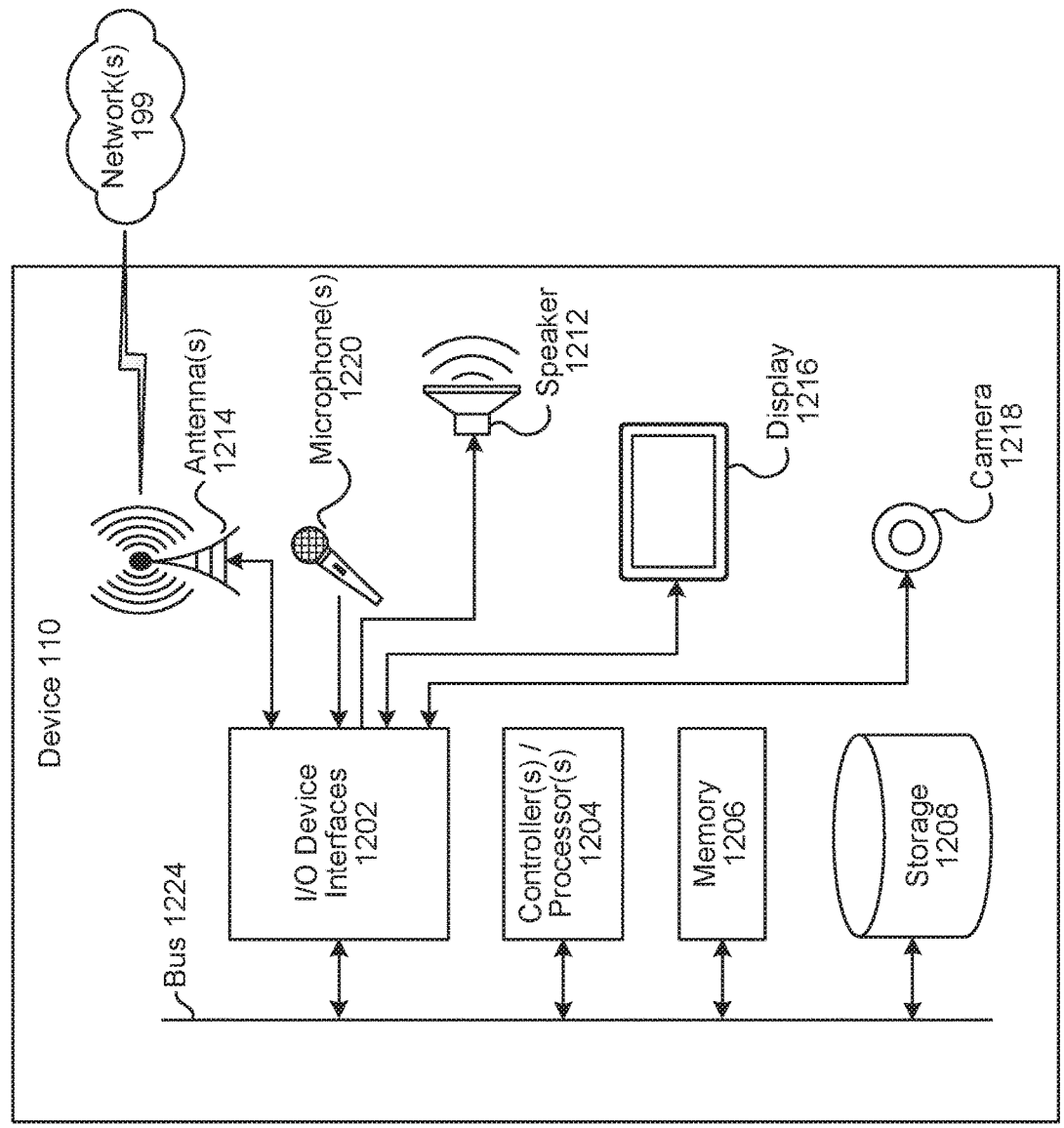
FIG. 12 is a block diagram conceptually illustrating example components of a device according to embodiments of the present disclosure.
Figure 13:
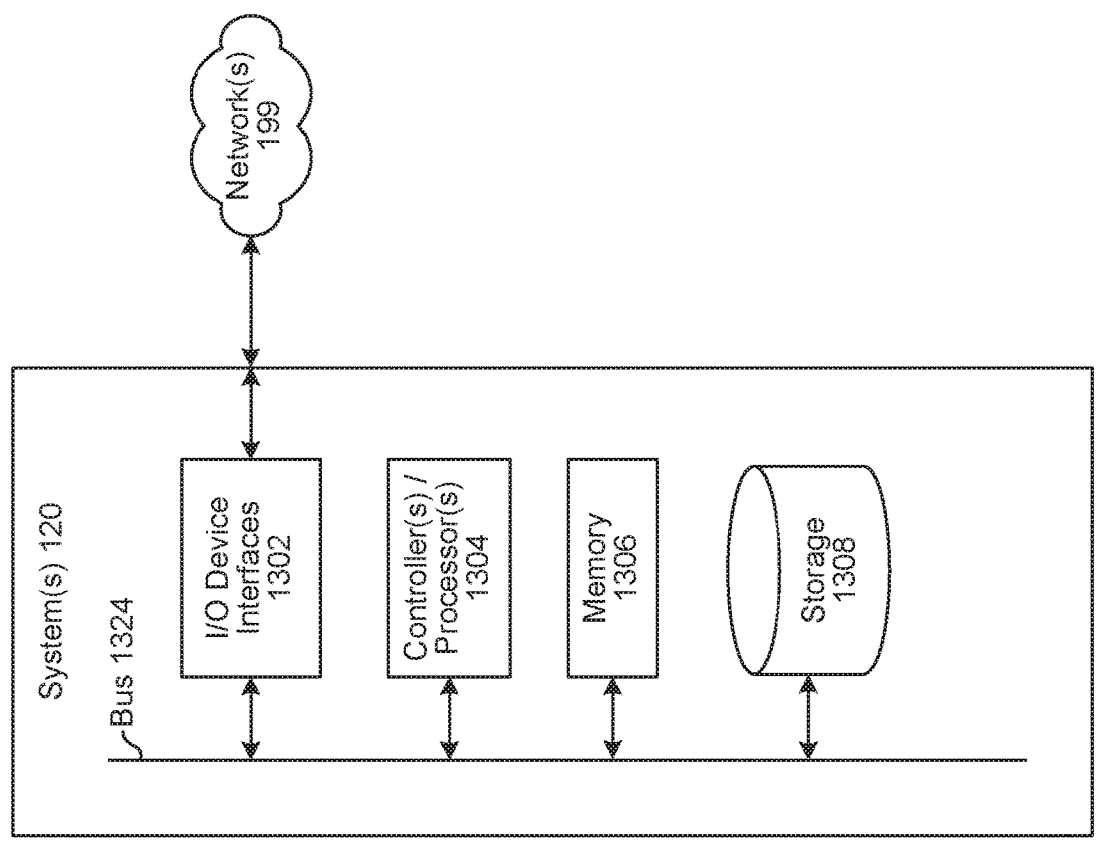
FIG. 13 is a block diagram conceptually illustrating example components of a server according to embodiments of the present disclosure.

FIG. 12 is a block diagram conceptually illustrating a device 110*a* and a device 110*b* that may be used with the system. FIG. 13 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/225) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1102/1202).

Computer instructions for operating each device (110/120/225) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/225) includes input/output device interfaces (1102/1202). A variety of components may be connected through the input/output device interfaces (1102/1202), as will be discussed further below. Additionally, each device (110/120/225) may include an address/data bus (1124/1224) for conveying data among components of the respective device. Each component within a device (110/120/225) may also be directly connected to other components in addition to (or instead of) being connected to other components across the bus (1124/1224).

Referring to FIG. 12, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones 1120, a wired headset or a wireless headset (not illustrated), etc. If an array of microphones 1120 is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the I/O device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1102/1202) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1102/1202), processor(s) (1104/1204), memory (1106/1206), and/or storage (1108/1208) of the device(s) 110 system(s) 120, or the skill system(s) 225, respectively. Thus, the ASR component 250 may have its own I/O device interface(s), processor(s), memory, and/or storage, the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 14:
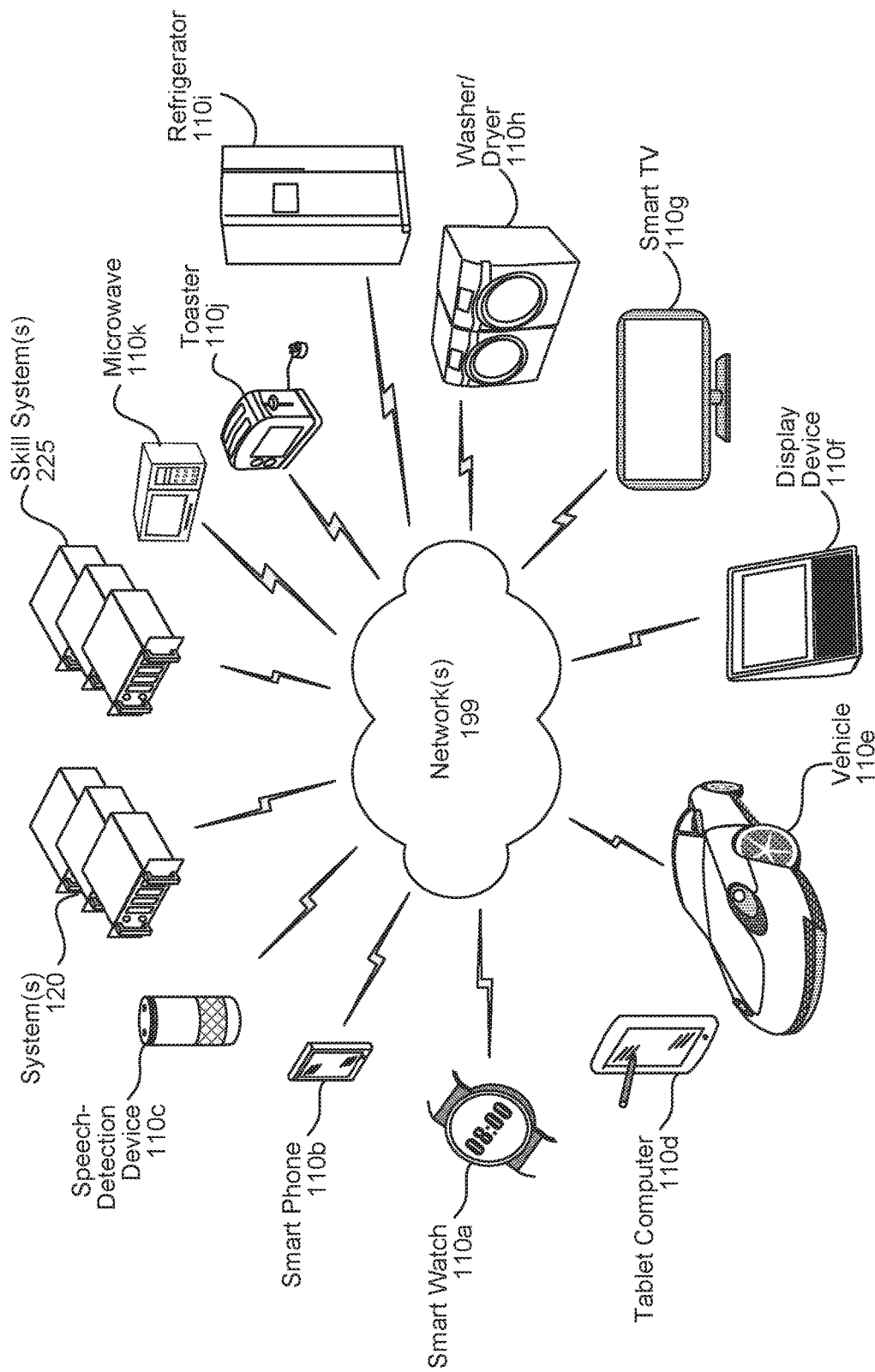
FIG. 14 illustrates an example of a computer network for use with the speech processing system.

As illustrated in FIG. 14, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a smart watch 110a, a smart phone 110b, a speech-detection device 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    processing, using a first model, first data, representing an original audio signal, to generate first model output data, wherein the first model output data represents at least one sentiment category and at least one attribute of a speaking user;
    determining, using the first model output data and a decoder, second data representing an estimation of the original audio signal;
    determining third data representing a comparison of the first data and the second data;
    generating a first trained model by updating the first model using the at least one attribute of the speaking user and the third data, wherein the first trained model is configured to detect one or more sentiment categories from audio;
    after generating the first trained model, receiving input audio data representing speech;
    determining, using a stored voice profile associated with a user profile, that a portion of speech corresponding to at least a first portion of the input audio data was spoken by a first user;
    using the first trained model, processing the first portion of the input audio data to generate second model output data;
    determining, using the second model output data, a first sentiment category corresponding to the first portion of the input audio data; and
    associating the first sentiment category with the user profile.

2. The computer-implemented method of claim 1, wherein the first trained model is a convolutional neural network machine learning model and the method further comprises:
    processing a first audio frame of the first portion using a second trained model to determine a first feature vector;
    processing a second audio frame of the first portion using the second trained model to determine a second feature vector; and
    processing the first feature vector and the second feature vector using the first trained model to determine the first sentiment category.

3. The computer-implemented method of claim 1, wherein the first trained model comprises a fully-connected neural network machine learning model, and the method further comprises:
    determining that a beginpoint of the first portion corresponds to the beginpoint of a first utterance and that an endpoint of the first portion corresponds to the endpoint of the first utterance;
    determining a plurality of feature vectors, wherein a first feature vector of the plurality of feature vectors corresponds to a first audio frame of the first portion and represents features of the first audio frame;
    generating a feature matrix comprising the plurality of feature vectors; and
    processing the feature matrix using the first trained model to generate the second model output data.

4. The computer-implemented method of claim 1, further comprising:
    using automatic speech recognition (ASR) processing to determine text data corresponding to the first portion;
    determining time data indicating when the first portion was received by a user device;
    generating output data including the text data, the time data, and an indicator of the first sentiment category; and
    displaying the output data using the user device.

5. The computer-implemented method of claim 1, wherein receiving the input audio data comprises receiving first input audio data representing a first utterance spoken by the first user and receiving second input audio data representing a second utterance spoken by a second user, and the method further comprising:
    determining a first confidence level that the first input audio data corresponds to the user profile associated with the first user;

determining that the first confidence level is above a threshold;

storing at least a second portion of the first input audio data as user audio data;

determining a second confidence level that the second input audio data corresponds to the user profile;

determining that the second confidence level is below the threshold; and discarding at least a third portion of the second input audio data.

6. A system comprising:

at least one processor; and at least one memory including instructions that, when executed by the at least one processor, cause the system to:

process, using a first model, first data, representing an original audio signal, to generate first model output data, wherein the first model output data represents at least one sentiment category and at least one attribute of a speaking user;

determine, using the first model output data and a decoder, second data representing an estimation of the original audio signal;

determine third data representing a comparison of the first data and the second data;

generate a first trained model by updating the first model using the at least one attribute of the speaking user and the third data, wherein the first trained model is configured to detect one or more sentiment categories from audio;

after generating the first trained model, receive input audio data representing speech;

determine, using a stored voice profile associated with a user profile, that a portion of speech corresponding to at least a first portion of the input audio data was spoken by a first user;

using the first trained model, process the first portion of the input audio data to generate second model output data;

determine, using the second model output data, a first sentiment category corresponding to the first portion of the input audio data; and associate the first sentiment category with the user profile.

7. The system of claim 6, wherein the first trained model is a convolutional neural network machine learning model, and wherein the instructions, when executed by the at least one processor, further cause the system to:

process a first audio frame of the first portion using a second trained model to determine a first feature vector;

process a second audio frame of the first portion using the second trained model to determine a second feature vector; and process the first feature vector and the second feature vector using the first trained model to determine the first sentiment category.

8. The system of claim 6, wherein the first trained model comprises a fully-connected neural network machine learning model, and wherein the instructions, when executed by the at least one processor, further cause the system to:

determine that a beginpoint of the first portion corresponds to the beginpoint of a first utterance and that an endpoint of the first portion corresponds to the endpoint of the first utterance;

determine a plurality of feature vectors, wherein a first feature vector of the plurality of feature vectors corresponds to a first audio frame of the first portion and represents features of the first audio frame;

generate a feature matrix comprising the plurality of feature vectors; and process the feature matrix using the first trained model to generate the second model output data.

9. The system of claim 6, wherein the instructions, when executed by the at least one processor, further cause the system to:

use automatic speech recognition (ASR) process to determine text data corresponding to the first portion;

determine time data indicating when the first portion was received by a user device;

generate output data including the text data, the time data, and an indicator of the first sentiment category; and display the output data using the user device.

10. The system of claim 6, wherein the input audio data comprises first input audio data representing a first utterance spoken by the first user and second input audio data representing a second utterance spoken by a second user, and the instructions when executed by the at least one processor, further cause the system to:

determine a first confidence level that the first input audio data corresponds to the user profile associated with the first user;

determine that the first confidence level is above a threshold;

store at least a second portion of the first input audio data as user audio data;

determine a second confidence level that the second input audio data corresponds to the user profile;

determine that the second confidence level is below the threshold; and discard at least a third portion of the second input audio data.

11. The computer-implemented method of claim 1, wherein generating the first trained model by updating the first model using the at least one attribute of the speaking user and the third data further comprises:

updating the first trained model using the at least one sentiment category and speech content.

12. The computer-implemented method of claim 1, wherein processing the first portion using the first trained model comprises determining a latent variable corresponding to the input audio data, wherein the latent variable is at least one of: an attribute of the speaking user, the one or more sentiment categories, or a speech content, and wherein the attribute of the speaking user is at least one of age, gender, or accent.

13. The system of claim 6, wherein the instructions that, when executed by the at least one processor, cause the system to generate the first trained model by updating the first model using the at least one attribute of the speaking user and the third data further cause the system to:

update the first trained model using the at least one sentiment category and speech content.

14. The system of claim 6, wherein the instructions that cause the system to process the first portion using the first trained model, when executed by the at least one processor, further cause the system to:

determine a latent variable corresponding to the input audio data, wherein the latent variable is at least one of: an attribute of the speaking user, the one or more sentiment categories, or a speech content, and wherein the attribute of the speaking user is at least one of: age, gender, or accent.

15. The computer-implemented method of claim 1, wherein the first model comprises an encoder.

16. The system of claim 6, wherein the first model comprises an encoder.

* * * * *